United States Patent
Mithun et al.

(10) Patent No.: US 11,734,910 B2
(45) Date of Patent: Aug. 22, 2023

(54) REAL-TIME OBJECT DETECTION USING DEPTH SENSORS

(71) Applicant: Robert Bosch GmbH, Stuttgart (DE)

(72) Inventors: Niluthpol Chowdhury Mithun, Lawrenceville, NJ (US); Sirajum Munir, Pittsburgh, PA (US); Charles Shelton, Monroeville, PA (US)

(73) Assignee: Robert Bosch GmbH, Stuttgart (DE)

(*) Notice: Subject to any disclaimer, the term of this patent is extended or adjusted under 35 U.S.C. 154(b) by 426 days.

(21) Appl. No.: 16/971,054

(22) PCT Filed: Feb. 19, 2019

(86) PCT No.: PCT/EP2019/054016
§ 371 (c)(1),
(2) Date: Aug. 19, 2020

(87) PCT Pub. No.: WO2019/162241
PCT Pub. Date: Aug. 29, 2019

(65) Prior Publication Data
US 2021/0089841 A1     Mar. 25, 2021

Related U.S. Application Data

(60) Provisional application No. 62/633,202, filed on Feb. 21, 2018.

(51) Int. Cl.
*G06V 10/44*     (2022.01)
*G06T 7/00*      (2017.01)
(Continued)

(52) U.S. Cl.
CPC .......... *G06V 10/454* (2022.01); *G06F 18/214* (2023.01); *G06F 18/24133* (2023.01);
(Continued)

(58) Field of Classification Search
CPC combination set(s) only.
See application file for complete search history.

(56) References Cited

U.S. PATENT DOCUMENTS

2016/0162782 A1* 6/2016 Park ................. G06N 3/082
                                                     706/17
2017/0032222 A1* 2/2017 Sharma ............. G06V 10/449
(Continued)

OTHER PUBLICATIONS

Saleh, k., et al., "Cyclist Detection in LIDAR Scans Using Faster R-CNN and Synthetic Depth Images", 2017 IEEE 20th International Conference on Intelligent Transportation Systems (ITSC), Oct. 16, 2017.*

(Continued)

*Primary Examiner* — Xuemei G Chen
(74) *Attorney, Agent, or Firm* — Maginot, Moore & Beck LLP

(57) ABSTRACT

A depth-based object-detection convolutional neural network is disclosed. The depth-based object-detection convolutional neural network described herein incorporates a base network and additional structure. The base network is configured to receive a depth image formatted as RGB image data as input, and compute output data indicative of at least one feature of an object in the RGB image data. The additional structure is configured to receive the output data of the base network as input, and compute predictions of the location of a region in the received depth image that includes the object and of a class of the object as output. An object detection device incorporating the depth-based object-detection convolutional neural network is operable in real time using an embedded GPU.

12 Claims, 12 Drawing Sheets

(51) Int. Cl.
    *G06T 7/90*     (2017.01)
    *G06N 3/04*     (2023.01)
    *G06F 18/2413*     (2023.01)
    *G06F 18/214*     (2023.01)
    *G06V 10/764*     (2022.01)
    *G06V 10/82*     (2022.01)
    *G06V 20/52*     (2022.01)

(52) U.S. Cl.
CPC ............. *G06N 3/04* (2013.01); *G06T 7/90* (2017.01); *G06T 7/97* (2017.01); *G06V 10/764* (2022.01); *G06V 10/82* (2022.01); *G06V 20/52* (2022.01); *G06T 2207/10024* (2013.01); *G06T 2207/10028* (2013.01)

(56) References Cited

U.S. PATENT DOCUMENTS

| | | | | |
|---|---|---|---|---|
| 2017/0364733 | A1* | 12/2017 | Estrada | G06V 20/13 |
| 2019/0079536 | A1* | 3/2019 | Zhu | G06K 9/6262 |
| 2019/0086546 | A1* | 3/2019 | Tsishkou | G06V 10/82 |
| 2020/0145661 | A1* | 5/2020 | Jeon | H04N 19/136 |

OTHER PUBLICATIONS

Microsoft, Kinect for Xbox One, 2017, cited version retrieved from The Wayback Machine Internet Archive at https://web.archive.org/web/20171203062014/https://xbox.com/en-US/xbox-one/accessories/kinect (7 pages).

Nvidia, Jetson TX1 Developer Kit, 2017, available at https://developer.nvidia.com/embedded/jetson-tx1-developer-kit (4 pages).

Wikipedia, Storey, 2018, cited year latest version available at https://en.wikipedia.org/w/index.php?title=Storey&oldid=873536485 (12 pages).

Alvarez, J. M. et al., "Learning the Number of Neurons in Deep Networks," In Advances in Neural Information Processing Systems (NIPS), 2016 (9 pages).

Babenko, B. et al., "Visual Tracking with Online Multiple Instance Learning," IEEE Conference on Computer Vision and Pattern Recognition, Jun. 2009, pp. 983-990 (8 pages).

Bay, H. et al., "SURF: Speeded Up Robust Features," In European Conference on Computer Vision (ECCV), 2006, pp. 404-417 (14 pages).

Boyd, S. et al., "Distributed Optimization and Statistical Learning via the Alternating Direction Method of Multipliers," Foundations and Trends in Machine Learning, 2010, vol. 3, No. 1, pp. 1-122 (125 pages).

Chen, L.-C. et al., "DeepLab: Semantic Image Segmentation with Deep Convolutional Nets, Atrous Convolution, and Fully Connected CRFs," arXiv:1606.00915v1 [cs.CV], Jun. 2016 (14 pages).

Dalal, N. et al., "Histograms of Oriented Gradients for Human Detection," Proceedings of the 2005 IEEE Computer Society Conference on Computer Vision and Pattern Recognition (CVPR'05), 2005, vol. 1 (8 pages).

Everingham, M. et al., "The PASCAL Visual Object Classes (VOC) Challenge," Int J Comput Vis (2010) 88: pp. 303-338, published online Sep. 9, 2009 (19 pages).

Glorot, X. et al., "Understanding the difficulty of training deep feedforward neural networks," Proceedings of the 13th International Conference on Artificial Intelligence and Statistics (AISTATS) 2010, pp. 249-256 (8 pages).

He, Y. et al., "Channel Pruning for Accelerating Very Deep Neural Networks," arXiv:1707.06168v2 [cs.CV] Aug. 21, 2017 (10 pages).

Howard, A. G., "Some Improvements on Deep Convolutional Neural Network Based Image Classification," arXiv:1312.5402 [cs.CV] Dec. 19, 2013 (6 pages).

Iandola, F. N. et al., "SqueezeNet: AlexNet-level Accuracy with 50x Fewer Parameters and < 0.5 MB Model Size," arXiv:1602.07360v4 [cs.CV] Nov. 4, 2016 (13 pages).

Jiang, L. et al., "Self-paced Curriculum Learning," AAAI'15: Proceedings of the Twenty-Ninth Association for the Advancement of Artificial (AAAI) Conference on Artificial Intelligence, Jan. 2015 (7 pages).

Kalyanaraman, A. et al., "FormaTrack: Tracking People based on Body Shape," Proceedings of the ACM on Interactive, Mobile, Wearable and Ubiquitous Technologies, vol. 1, No. 3, Article 61, Sep. 2017 (21 pages).

Karanam, C. R. et al., "3D Through-Wall Imaging with Unmanned Aerial Vehicles Using WiFi," Proceedings of the 16th ACM/IEEE International Conference on Information Processing in Sensor Networks, Apr. 2017 (IPSN 2017) (12 pages).

Khalil, N. et al., "SonicDoor: Scaling Person Identification with Ultrasonic Sensors by Novel Modeling of Shape, Behavior and Walking Patterns," Proceedings of 4th ACM International Conference on Systems for Energy-Efficient Built Environments, Nov. 2017 (BuildSys'17) (10 pages).

Krizhevsky, A. et al., "ImageNet Classification with Deep Convolutional Neural Networks," Advances in Neural Information Processing Systems (NIPS), 2012 (9 pages).

Luo, J.-H. et al.,"ThiNet: A Filter Level Pruning Method for Deep Neural Network Compression," arXiv:1707.06342v1 [cs.CV] Jul. 20, 2017 (9 pages).

Mithun, N. C. et al., "Generating Diverse Image Datasets with Limited Labeling," ACM Multimedia Conference, Oct. 2016, pp. 566-570 (5 pages).

Munir, S. et al., "Real-Time Fine Grained Occupancy Estimation using Depth Sensors on ARM Embedded Platforms," IEEE Real-Time and Embedded Technology and Applications Symposium (RTAS), Apr. 2017 (12 pages).

Munir, S. et al., "Demo: FORK—Fine grained Occupancy estimatoR using Kinect on ARM Embedded Platforms," Proceedings of The 4th ACM International Conference on Systems for Energy-Efficient Built Environments (BuildSys'17), Nov. 2017 (2 pages).

Pentina, A. et al., "Curriculum Learning of Multiple Tasks," Proceedings of the IEEE Conference on Computer Vision and Pattern Recognition (CVPR), 2015, pp. 5492-5500 (9 pages).

Redmon, J. et al., "You Only Look Once: Unified, Real-Time Object Detection," Proceedings of the IEEE Conference on Computer Vision and Pattern Recognition (CVPR), 2016, pp. 779-788 (10 pages).

Ren, S. et al., "Faster R-CNN: Towards Real-Time Object Detection with Region Proposal Networks," Advances in Neural Information Processing Systems (NIPS), 2015 (9 pages).

Roy, K. et al., "Image Similarity Measure using Color Histogram, Color Coherence Vector, and Sobel Method," International Journal of Science and Research (IJSR), Jan. 2013, vol. 2, Iss. 2, pp. 538-543 (6 pages).

Sikiric, I. et al., "Classifying traffic scenes using the GIST image descriptor," arXiv:1310.0316 [cs.CV] Oct. 1, 2013] (6 pages).

Simonyan, K. et al., "Very Deep Convolutional Networks for Large-Scale Image Recognition," arXiv:1409.1556v5 [cs.CV] Dec. 23, 2014 (13 pages).

Lecun, Y. et al., "Convolutional Networks for Images, Speech, and Time-Series," from The Handbook of Brain Theory and Neural Networks, MIT Press, 1995 (14 pages).

Socher, R. et al., "Convolutional-Recursive Deep Learning for 3D Object Classification," Advances in Neural Information Processing Systems (NIPS), 2012 (9 pages).

Song, S. et al., "SUN RGB-D: A RGB-D Scene Understanding Benchmark Suite," Proceedings of 28th IEEE Conference on Computer Vision and Pattern Recognition (CVPR 2015), 2015 (10 pages).

Szegedy, C. et al., "Going Deeper with Convolutions", Proceedings of the IEEE Conference on Computer Vision and Pattern Recognition (CVPR), 2015, pp. 1-9 (9 pages).

Ulrich, I. et al., "Appearance-Based Place Recognition for Topological Localization," IEEE International Conference on Robotics and Automation, Apr. 2000, pp. 1023-1029 (7 pages).

Xu, C. et al., "SCPL: Indoor Device-Free Multi-Subject Counting and Localization Using Radio Signal Strength," International Conference on Information Processing in Sensor Networks (IPSN), Apr. 2013 (12 pages).

(56) References Cited

OTHER PUBLICATIONS

Yao, S. et al., "DeepIoT: Compressing Deep Neural Network Structures for Sensing Systems with a Compressor-Critic Framework," Proceedings of the 15th ACM Conference on Embedded Network Sensor Systems (SenSys '17), Nov. 2017, arXiv:1706.01215v3 [cs.LG] Nov. 22, 2017 (14 pages).

Yosinski, J. et al., "How transferable are features in deep neural networks?," Advances in Neural Information Processing Systems 27 (NIPS 2014), 2014 (9 pages).

Zeiler, M. D. et al., "Visualizing and Understanding Convolutional Networks," 13th European Conference on Computer Vision, ECCV 2014, Sep. 2014, pp. 818-833 (16 pages).

Zhang, P. et al., "Redesigning the Wearable Camera Pipeline to Detect Key Body Parts at Low Power," Technical Report, Microsoft Research, Apr. 2015 (14 pages).

Zhu, H. et al., "Discriminative Multi-modal Feature Fusion for RGBD Indoor Scene Recognition," Proceedings of the IEEE Conference on Computer Vision and Pattern Recognition (CVPR), Jun. 2016, pp. 2969-2976 (8 pages).

Alippi, C. et al., "RTI Goes Wild: Radio Tomographic Imaging for Outdoor People Detection and Localization," IEEE Transactions on Mobile Computing, Oct. 2016, vol. 15, No. 10, pp. 2585-2598 (14 pages).

Ashok, A. et al., "Low-Power Radio-Optical Beacons for In-View Recognition," IEEE 82nd Vehicular Technology Conference (VTC2015-Fall), Sep. 2015 (5 pages).

Banica, D. et al., "Second-Order Constrained Parametric Proposals and Sequential Search-Based Structured Prediction for Semantic Segmentation in RGB-D Images," Proceedings of the IEEE Conference on Computer Vision and Pattern Recognition (CVPR), Jun. 2015, pp. 3517-3526 (10 pages).

Cong, Y. et al., "Towards Scalable Summarization of Consumer Videos Via Sparse Dictionary Selection," IEEE Transactions on Multimedia, Feb. 2012, vol. 14, No. 1, pp. 66-75 (10 pages).

Elhamifar, E. et al., "See All by Looking at A Few: Sparse Modeling for Finding Representative Objects," IEEE Conference on Computer Vision and Pattern Recognition, Jun. 2012, pp. 1600-1607 (8 pages).

Gupta, S. et al., "Indoor Scene Understanding with RGB-D Images: Bottom-up Segmentation, Object Detection and Semantic Segmentation," International Journal of Computer Vision, Nov. 2014, vol. 112, Iss. 2, pp. 133-149 (17 pages).

Gupta, S. et al., "Cross Modal Distillation for Supervision Transfer," IEEE Conference on Computer Vision and Pattern Recognition (CVPR), Jun. 2016, pp. 2827-2836 (10 pages).

Jia, Y. et al., "Caffe: Convolutional Architecture for Fast Feature Embedding," Proceedings of the 22nd ACM International conference on Multimedia (MM '14), Nov. 2014, pp. 675-678 (4 pages).

Lebedev, V. et al., "Fast ConvNets Using Group-wise Brain Damage," Proceedings of the IEEE Conference on Computer Vision and Pattern Recognition (CVPR), Jun. 2016, pp. 2554-2564 (11 pages).

Liu, W. et al., "SSD: Single Shot MultiBox Detector," European Conference on Computer Vision (ECCV), Sep. 2016, pp. 21-37 (17 pages).

International Search Report corresponding to PCT Application No. PCT/EP2019/054016, dated Jun. 12, 2019 (4 pages).

Li, H. et al., "Pruning Filters for Efficient ConvNets," 5th International Conference on Learning Representations, ICLR 2017, arXiv:1608.08710v3 [cs.CV] Mar. 10, 2017 (13 pages).

Mithun, N. C. et al., "ODDS: Real-Time Object Detection using Depth Sensors on Embedded GPUs," in Proceedings of Information Processing in Sensor Networks (IPSN) '18, Apr. 11, 2018 (12 pages).

Gupta, S. et al., "Learning Rich Features from RGB-D Images for Object Detection and Segmentation," ECCV 2014, Lecture Notes in Computer Science (LNCS), vol. 8695, Springer International Publishing, pp. 345-360, 2014 (16 pages).

Saleh, K. et al., "Cyclist Detection in LIDAR Scans Using Faster R-CNN and Synthetic Depth Images," 2017 IEEE 20th International Conference on Intelligent Transportation Systems (ITSC), Oct. 16, 2017 (6 pages).

Wang, P. et al., "Action Recognition From Depth Maps Using Deep Convolutional Neural Networks," IEEE Transactions on Human-Machine Systems, vol. 46, No. 4, 498-509, Aug. 2016 (12 pages).

Bengio, Y. et al., "Curriculum Learning," Proceedings of the 26th International Conference on Machine Learning, pp. 41-48, 2009 (8 pages).

Lowe, D. G., "Object Recognition from Local Scale-Invariant Features," Proceedings of the Seventh IEEE International Conference on Computer Vision, Sep. 1999 (8 pages).

Mohammadmoradi, H. et al., "Measuring People-Flow Through Doorways using Easy-to-Install IR Array Sensors," 13th International Conference on Distributed Computing in Sensor Systems (DCOSS), Jun. 2017 (9 pages).

Pan, S. et al., "Indoor Person Identification through Footstep Induced Structural Vibration," Proceedings of the 16th International Workshop on Mobile Computing Systems and Applications (HotMobile '15), Feb. 2015, pp. 81-86 (6 pages).

Papaioannou, S. et al., "Tracking People in Highly Dynamic Industrial Environments," IEEE Transactions on Mobile Computing, Aug. 2017, vol. 16, No. 8, pp. 2351-2365 (15 pages).

Wang, X. et al., "Unsupervised Learning of Visual Representations using Videos," IEEE International Conference on Computer Vision (ICCV), Dec. 2015, pp. 2794-2802 (9 pages).

Zhou, H. et al., "Less Is More: Towards Compact CNNs," European Conference on Computer Vision (ECCV), Sep. 2016, pp. 662-677 (16 pages).

Mithun, N. C. et al., "ODDS: Real-Time Object Detection using Depth Sensors on Embedded GPUs," Zenodo, Feb. 1, 2018 available at https://doi.org/10.5281/zenodo.1163770 (2 pages).

\* cited by examiner

| Layers | Network No Pruning No. of Filters | No. of Weights | Low Pruning No. of Filters | No. of Weights | High Pruning No. of Filters | No. of Weights |
|---|---|---|---|---|---|---|
| Base Net Layer 1 | 64 | (3*3*3)*64 = 1,728 | 32 | (3*3*3)*32 = 864 | 16 | (3*3*3)*16 = 432 |
| Base Net Layer 2 | 64 | (3*3*64)*64 = 36,864 | 32 | (3*3*32)*32 = 9,216 | 16 | (3*3*16)*16 = 2,304 |
| Base Net Layer 3 | 128 | (3*3*64)*128 = 73,728 | 64 | (3*3*32)*64 = 18,432 | 32 | (3*3*16)*32 = 4,608 |
| Base Net Layer 4 | 128 | (3*3*128)*128 = 147,456 | 64 | (3*3*64)*64 = 36,864 | 32 | (3*3*32)*32 = 9,216 |
| Base Net Layer 5 | 256 | (3*3*128)*256 = 294,912 | 128 | (3*3*64)*128 = 73,728 | 64 | (3*3*32)*64 = 18,432 |
| Base Net Layer 6 | 256 | (3*3*256)*256 = 598,824 | 128 | (3*3*128)*128 = 147,456 | 64 | (3*3*64)*64 = 36,864 |
| Base Net Layer 7 | 512 | (3*3*256)*256 = 598,824 | 128 | (3*3*128)*128 = 147,456 | 64 | (3*3*64)*64 = 36,864 |
| Base Net Layer 8 | 512 | (3*3*256)*512 = 1,179,648 | 256 | (3*3*128)*256 = 294,912 | 128 | (3*3*64)*128 = 73,728 |
| Base Net Layer 9 | 512 | (3*3*512)*512 = 2,359,296 | 256 | (3*3*256)*256 = 598,824 | 128 | (3*3*128)*128 = 147,456 |
| Base Net Layer 10 | 512 | (3*3*512)*512 = 2,359,296 | 512 | (3*3*256)*512 = 1,179,648 | 512 | (3*3*128)*512 = 598,824 |
| Base Net Layer 11 | 512 | (3*3*512)*512 = 2,359,296 | 512 | (3*3*512)*512 = 2,359,296 | 128 | (3*3*512)*128 = 598,824 |
| Base Net Layer 12 | 512 | (3*3*512)*512 = 2,359,296 | 512 | (3*3*512)*512 = 2,359,296 | 128 | (3*3*128)*128 = 147,456 |
| Base Net Layer 13 | 1024 | (3*3*512)*1024 = 4,718,592 | 1024 | (3*3*512)*1024 = 4,718,592 | 512 | (3*3*128)*512 = 598,824 |
| Base Net Layer 14 | 1024 | (1*1*1024)*1024 = 1,048,576 | 1024 | (1*1*1024)*1024 = 1,048,576 | 1024 | (1*1*512)*1024 = 524,288 |
| Base Net Layer 15 | 256 | (1*1*1024)*256 = 262,144 | 256 | (1*1*1024)*256 = 262,144 | 128 | (1*1*1024)*128 = 131,072 |
| maxpool Layer | | | | | | |
| Feat M. Layer 1 | 512 | (3*3*256)*512 = 1,179,648 | 512 | (3*3*256)*512 = 1,179,648 | 512 | (3*3*256)*512 = 1,179,648 |
| maxpool Layer | 128 | (1*1*512)*128 =65,536 | 128 | (1*1*512)*128 =65,536 | 64 | (1*1*512)*128 =65,536 |
| Feat M. Layer 2 | 256 | (3*3*128)*256 = 294,912 | 256 | (3*3*128)*256 = 294,912 | 256 | (3*3*64)*256 = 147,456 |
| maxpool Layer | 128 | (1*1*256)*128 =32,768 | 128 | (1*1*256)*128 =32,768 | 64 | (1*1*256)*64 = 16,384 |
| Feat M. Layer 3 | 256 | (3*3*128)*256 = 294,912 | 256 | (3*3*128)*256 = 294,912 | 256 | (3*3*64)*256 = 147,456 |
| maxpool Layer | 128 | (1*1*256)*128 =32,768 | 128 | (1*1*256)*128 =32,768 | 64 | (1*1*256)*64 = 16,384 |
| Feat M. Layer 4 | 256 | (3*3*128)*256 = 294,912 | 256 | (3*3*128)*256 = 294,912 | 256 | (3*3*64)*256 = 147,456 |
| Total Parameters | | 22,935,232 = 22.935 Million | | 17,801,056 = 17.801 Million | | 4,769,968 = 4.769 Million |
| Model Size | | 96.43 MB | | 76.36 MB | | 23.02 MB |

Fig. 11

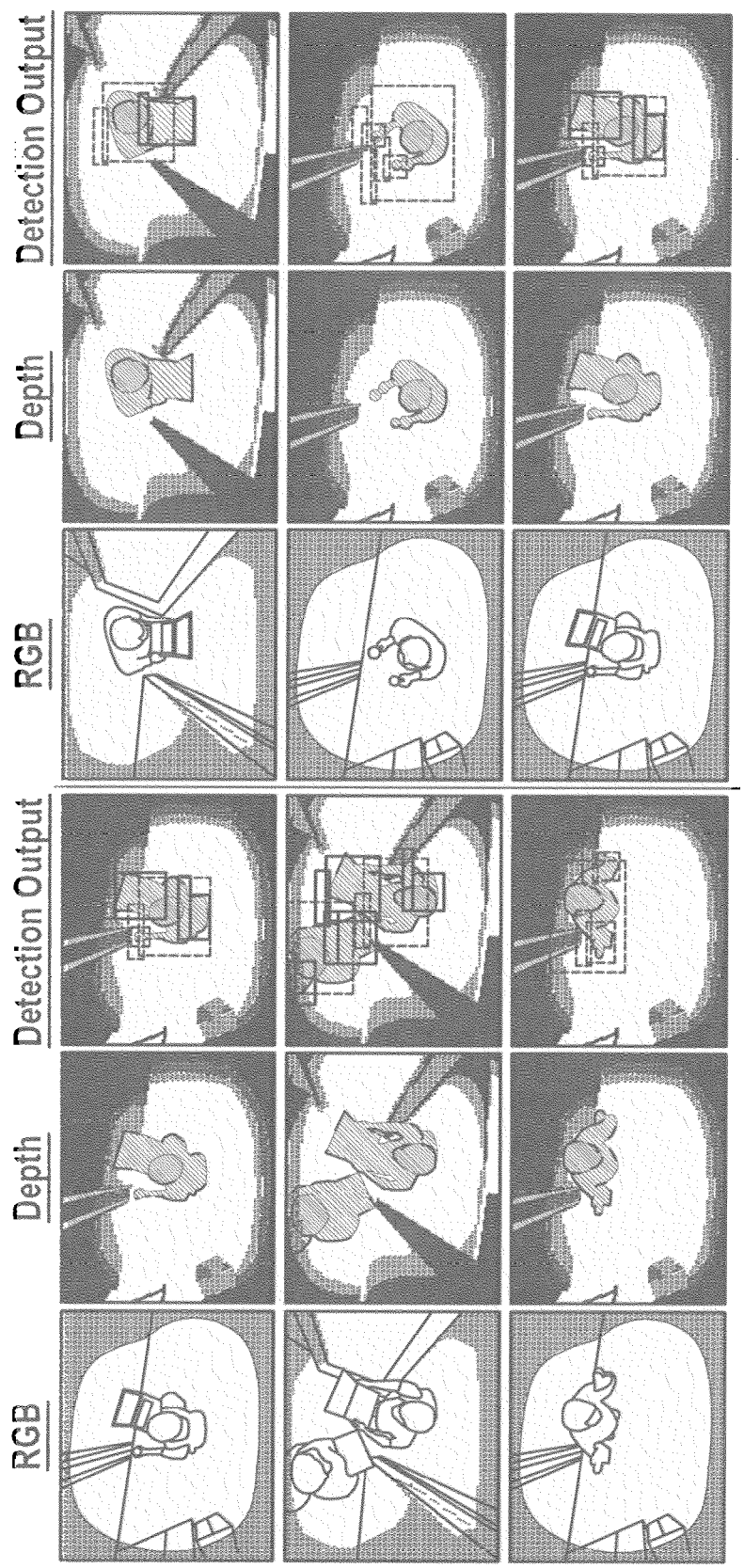

REAL-TIME OBJECT DETECTION USING DEPTH SENSORS

This application is a 35 U.S.C. § 371 National Stage Application of PCT/EP2019/054016, filed on Feb. 19, 2019, which claims the benefit of priority of U.S. provisional application Ser. No. 62/633,202, filed on Feb. 21, 2018 the disclosures of which is herein are incorporated herein by reference in their entirety.

FIELD

The method and system disclosed in this document relate to object detection using artificial neural networks and, more particularly, to convolutional neural networks that evaluate depth sensor data.

BACKGROUND

Unless otherwise indicated herein, the materials described in this section are not prior art to the claims in this application and are not admitted to the prior art by inclusion in this section.

Object detection is a fundamental problem in computer vision. Unlike image classification, which involves classifying an image as-a-whole, object detection is a more challenging task that involves identifying and localizing objects within an image. Traditional computer vision approaches to this problem generally detect features in an image that are predetermined to correspond with an object, such as particular colors, shapes, histograms, gradients, color vectors, etc., and identify a region of the image as an object based on such detection. Modern techniques, however, generally utilize machine learning in order to identify and localized objects without a priori knowledge of the features used to identify a particular object.

Convolutional Neural Networks (CNNs) have achieved state-of-the-art results on this problem, thanks to the availability of large datasets of classified images and of powerful computation infrastructure. CNNs automatically extract discriminative features from training images and use them in combination to identify objects. This enables CNNs to significantly outperform traditional computer vision approaches on large-scale datasets such as ImageNet, as the latter usually rely on heuristic features.

Several modern object detection techniques utilize a CNN at least partially trained for image classification, and thereafter fine-tuned for detecting objects. Such techniques generally require an extensive amount of computing power, both for training the CNN and for evaluating input images using the trained CNN. Further, tradeoffs that can reduce the needed computing power generally severely impact the accuracy of detection. As a result, object detection techniques that can run in "real time," i.e. are able to evaluate multiple image frames per second, are generally cost prohibitive due to the computing power required, are too inaccurate to provide meaningful results, or both.

Considerable efforts have been made to increase the accuracy of CNN-based object detection techniques. In one example, a CNN is trained with a data set that includes traditional red-green-blue (RGB) images paired with depth images. A depth image is an image where the intensity of each pixel represents a distance from a depth sensor to a detected surface. Here, a "pair" means an RGB image and a depth image of the same target from the same perspective, so that each pixel location of the depth image directly corresponds to a pixel location of the paired RGB image. The depth image acts as an additional data channel when training the CNN, and smooths out pixel noise generally present in RGB images. While this smoothing out of pixel noise may increase the accuracy of object detection, such CNNs still require considerable computing power to operate. Further, the requirement of training data that includes RGB image and depth image pairs significantly increases the difficulty and expense of building a CNN of this type.

Thus, an object detection technique that can operate in real-time would be beneficial. A technique that exhibits reduced computing power needs would also be beneficial. A technique that does not require complex training data would also be beneficial.

SUMMARY

A method for building a depth-based object-detection convolutional neural network includes storing, in a memory, data and program instructions corresponding to a convolutional neural network. The data and program instructions include a base network and additional structure. The base network is configured to receive RGB image data as input and compute output data indicative of at least one feature of an object in the received RGB image data, the base network pre-trained to compute feature detections using an RGB image dataset. The additional structure is configured to receive the output data of the base network as input and compute predictions of a location of a region in the received RGB image that includes the object and of a class of the object, such that the object detection convolutional neural network is configured to receive RGB test image data as input and compute the predictions as output. The method further includes storing, in the memory, a dataset of training depth images. Each of the depth images includes at least one annotation that localizes a region of a respective depth image as containing a training object and identifies a class of the training object. The method further includes generating a training dataset for the object detection convolutional neural network by reformatting each image in the dataset of training depth images as an RGB image. The method further includes training the object detection convolutional neural network with the processor using the training dataset to form a depth-based object-detection convolutional neural network configured to receive a depth image formatted as RGB image data as input and compute predictions of a location of a region in the received depth image that includes a test object and of a class of the test object as output.

In some embodiments, the memory includes a complexity metric for each image in the dataset of training depth images, the complexity metric indicative of a feature complexity of the respective image. The processor is configured to introduce the training dataset to the object detection convolutional neural network according to a curriculum that orders images within the training dataset by ascending complexity metric.

In some embodiments, the training dataset is segmented into a first batch and a second batch such that the first batch has complexity metrics that are higher than complexity metrics of the second batch. The curriculum includes training the object detection convolutional neural network using the first batch of the training dataset, and then training the object detection convolutional neural network using the first batch and the second batch of the training dataset.

In some embodiments, the object detection convolutional neural network includes a plurality of convolutional filters distributed throughout a sequence of layers. Each convolutional filter in the plurality of convolutional filters is configured to receive input data and compute convolutional output data by convolving a respective matrix of weights over the input data. Each layer in the sequence of layers is configured to receive input data and compute output data formed by a combination of the output data of each filter in the layer. The base network includes a first subset of the sequence of layers, and the additional structure includes a second subset of the sequence of layers.

In some embodiments, the second portion of the sequence of layers includes a plurality feature map layers. Each feature map layer has a different dimensionality, and is configured to detect features in the input data for the feature map layer of a scale corresponding to the respective dimensionality of the feature map layer. The plurality of feature map layers is arranged within the sequence of layers in order of descending dimensionality.

In some embodiments, the additional structure further includes a post-processing block. The post-processing block is configured to receive the output data from each feature map layer, select a particular feature from amongst features detected by the plurality of feature map layers having a relative highest correspondence with an object of a particular classification, compute a location of the object based on a location of the feature, and output the location and classification of the object.

In some embodiments, the method further includes, after training the object detection convolutional neural network, identifying at least one of the plurality of convolutional filters that at least one of (i) is at least partially redundant of another of the plurality of convolutional filters, and (ii) has an effect on the output of the object detection convolutional neural network below a predetermined threshold. The method further includes modifying the data and program instructions corresponding to the depth-based object-detection convolutional neural network to eliminate the identified at least one filter from the depth-based object detection convolutional neural network.

In some embodiments, the method further includes, after eliminating the identified at least one filter from the depth-based object detection convolutional neural network, training, with the processor, the depth-based object-detection convolutional neural network using the training dataset.

In some embodiments, when training the object detection convolutional neural network, the matrices of weights of filters within the first portion of the sequence of layers in the base network are frozen, and when training the depth-based object detection convolutional neural network, the matrices of weights of all filters within the depth-based object detection convolutional neural network are unfrozen.

A system for building a depth-based object detection convolutional neural network includes a data storage device, and at least one processor operably connected to the data storage device. The data storage device is configured to store a dataset of training depth images, as well as data and program instructions corresponding to an object detection convolutional neural network, which includes a base network and additional structure. The base network is configured to receive RGB image data as input and compute output data indicative of at least one feature of an object in the received RGB image data, the base network pre-trained to compute feature detections using an RGB image dataset. The additional structure is configured to receive the output data of the base network as input and compute predictions of a location of a region in the received RGB image that includes the object and of a class of the object, such that the object detection convolutional neural network is configured to receive RGB test image data as input and compute the predictions as output. The a dataset of training depth images includes, for each depth image, at least one annotation that localizes a region of a respective depth image as containing a training object and identifies a class of the training object. The at least one processor is configured to execute the plurality of program instructions on the data storage device to (i) generate a training dataset by reformatting the dataset of depth images as RGB image data, and (ii) train the object detection convolutional neural network using the training dataset in order to form a depth-based object detection convolutional neural network.

An object detection system, for localizing an object within a scene and identifying a classification for the object, includes a data storage device, a depth sensor, an output component, and a processor operatively connected to the data storage device, the depth sensor, and the output component. The data storage device store data and program instructions corresponding to a depth-based object-detection convolutional neural network, the depth-based object-detection convolutional neural network configured to receive a depth image formatted as RGB image data as input and compute predictions of a location of a region in the received depth image that includes a test object and of a class of the test object as output. The depth sensor is configured to sense distances to various points on surfaces in a scene and compute depth image data with reference to the sensed distances. The processor is configured to operate the depth sensor to collect depth image data, reformat the depth image data as RGB image data, determine a prediction of a location of a region in the depth image data that includes the object and identify a classification for the object by feeding the corresponding RGB image data through the depth-based object-detection convolutional neural network, and output the location and classification of the object via the output component.

In some embodiments, the depth-based object-detection convolutional neural network includes a base network and additional structure. The base network is configured to receive a depth image formatted as RGB image data as input and compute output data indicative of at least one feature of an object in the RGB image data. The additional structure is configured to receive the output data of the base network as input and compute predictions of the location of a region in the received depth image that includes the test object and of the class of the test object as output.

In some embodiments, the processor is a system-on-a-chip that includes a central processing unit and a graphics processing unit embedded with the central processing unit.

In some embodiments, the processor is configured to operate the depth sensor to collect depth image data and operate the output component to output the location and classification of the object via the output component at a rate in excess of 1 frame per second.

In some embodiments, the processor is configured to determine prediction of locations of a plurality of objects in the image data and a respective identification for each object.

BRIEF DESCRIPTION OF THE DRAWINGS

The foregoing aspects and other features of the method, system, and non-transitory computer readable medium for a depth-based object detection convolutional neural network are described in further detail below with regard to the Drawings, in which:

FIG. 11 shows a listing of data describing layers of various depth-based object detection convolutional neural network after applying various post-training optimization processes.

FIG. 12 shows a set of input depth images alongside illustrative RGB images and output images annotated to locate and classify objects within the input depth images.

DETAILED DESCRIPTION

Figure 1:
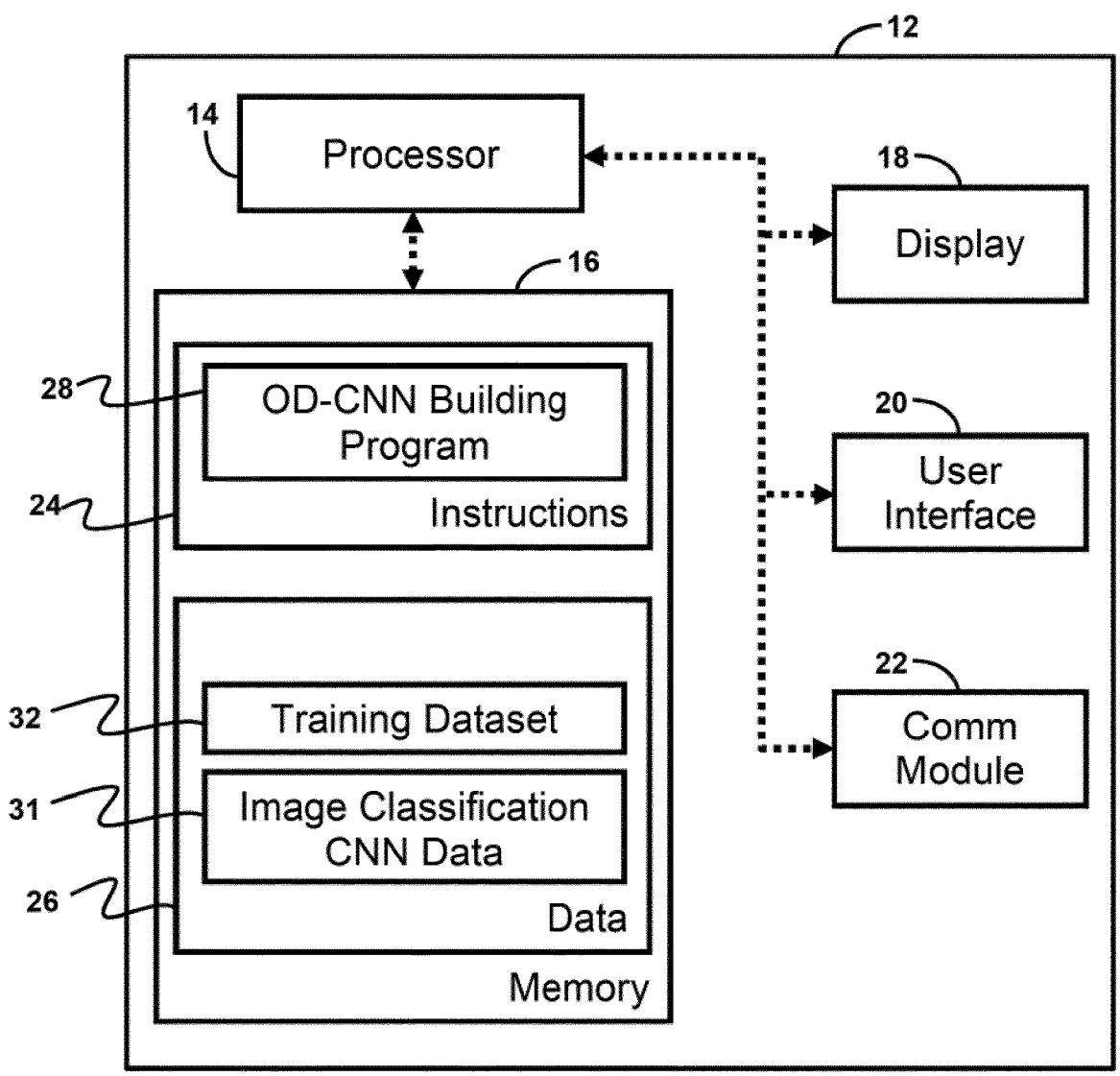
FIG. 1 shows a block diagram of an exemplary embodiment of a computing system for building a depth-based object detection convolutional neural network.

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles of the disclosure as would normally occur to one skilled in the art which this disclosure pertains.

Depth-based object detection techniques utilizing a deep convolutional neural network (CNN) are introduced herein. An Object-detection Depth-based CNN (OD-CNN) according to this disclosure incorporates the feature-detection portion of an image classification CNN trained using a data set of red-green-blue (RGB) images with image classification labels. Incorporation of this feature-detection portion, referred to herein as a "base network," transfers learning pertaining to feature detection in images. The base network is fine-tuned for object detection to form an OD-CNN, and is trained using a data set of un-paired depth images with object identification labels.

The trained OD-CNN is configured to detect objects in an input un-paired depth image, and thus is advantageously operable without any RGB image input. Object detection with the techniques described herein has considerably reduced computing power requirements, and is much faster at detecting objects than conventional efforts. In particular, the techniques disclosed herein are advantageously operable in real-time and/or without the requirement of dedicated graphical processing unit (GPU). Further, this increase in speed and reduction in computing power need is advantageously achieved without a significant drop in accuracy of detection.

System for Building an OD-CNN

FIG. 1 shows a block diagram of an exemplary embodiment of a computing system 10 for building an OD-CNN. In various embodiments, the system 10 one or more of collects, annotates, and organizes a training data set of depth images with object identification labels. In various embodiments, the system 10 one or more of extracts a feature-detection portion of an image classification CNN and builds a base network. In various embodiments, the system 10 one or more fine-tunes a base network to form an OD-CNN, trains the OD-CNN using a training data set of depth images, and optimizes the trained OD-CNN.

The computing system 10 is typically provided in a housing, cabinet, or the like 12 that is configured in a typical manner for a computing device. In the illustrated embodiment, the computing system 10 includes a processor 14, memory 16, a display 18, a user interface 20, and a network communications module 22. It will be appreciated, however, that the illustrated embodiment of the computing system 10 is only one exemplary embodiment of a computing system 10 and is merely representative of any of various manners or configurations of a personal computer, laptop computer, server, or any other data processing systems that are operative in the manner set forth herein.

The processor 14 is configured to execute instructions to operate the computing system 10 to enable the features, functionality, characteristics and/or the like as described herein. To this end, the processor 14 is operably connected to the memory 16, display 18, the user interface 20, and the network communications module 22. The processor 14 generally comprises one or more processors which may operate in parallel or otherwise in concert with one another. It will be recognized by those of ordinary skill in the art that a "processor" includes any hardware system, hardware mechanism or hardware component that processes data, signals, or other information. Accordingly, the processor 14 may include a system with a central processing unit, multiple processing units, or dedicated circuitry for achieving specific functionality.

In some embodiments, the processor 14 includes a central processing unit (CPU) and a graphics processing unit (GPU) connected to each other via a peripheral connection device such as PCI express or another suitable peripheral data connection. The GPU includes hardware and software for manipulating and processing image data. In some embodiments, processor 14 executes software programs including drivers and other software instructions using the hardware functionality in the GPU.

The memory 16 may be of any type of device capable of storing information accessible by the processor 14, such as a memory card, ROM, RAM, write-capable memories, read-only memories, hard drives, discs, flash memory, or any of various other computer-readable medium serving as data storage devices as will be recognized by those of ordinary skill in the art. The memory 16 is configured to store program instructions 24 for execution by the processor 14, as well as data 26. The program instructions 24 at least include an OD-CNN building program 28, which includes at least some instructions that implement the formation and training of an OD-CNN. In at least one embodiment, the data 26 includes image classification CNN data 31 usable for build a base network, as well as training dataset(s) 32 which relate the particular task for which an OD-CNN is being designed. In at least some embodiments, the training dataset(s) 32 comprise un-paired depth images with labels identifying objects within the depth images that represent classes of objects to be detected by the OD-CNN.

The network communication module 22 of the computing system 10 provides an interface that allows for communication with any of various devices using various means and may comprise one or more modems, transceivers, network adapters, or the like. In particular, the network communications module 22 may include a local area network port that allows for communication with any of various local computers housed in the same or nearby facility. In some embodiments, the network communications module 22 further includes a wide area network port that allows for communications with remote computers over the Internet. Alternatively, the computing system 10 communicates with the Internet via a separate modem and/or router of the local area network. In one embodiment, the network communications module is equipped with a Wi-Fi transceiver or other wireless communications device. Accordingly, it will be appreciated that communications with the computing system 10 may occur via wired communications or via the wireless communications. Communications may be accomplished using any of various known communications protocols.

The computing system 10 may be operated locally or remotely by a user. To facilitate local operation, the computing system 10 may include the display 18 and the user interface 20. Via the user interface 20, a user may access the instructions, including the OD-CNN building program 28, and may collect data from and store data to the memory 16. In at least one embodiment, the display 18 may include an LCD display screen or the like. In at least one embodiment, the user interface 20 may suitably include a mouse or other pointing device, a keyboard or other keypad, speakers, and a microphone, as will be recognized by those of ordinary skill in the art. It will be appreciated that the display 18 and the user interface 20 may be integrated on or within the housing 12 or may be external devices which are operably connected via a connector arranged on the housing 12 (not shown). Alternatively, in some embodiments, a user may operate the computing system 10 remotely from another computing device which is in communication therewith via the network communication module 22 and has an analogous display and user interface.

Building and Training an OD-CNN

Figure 2:
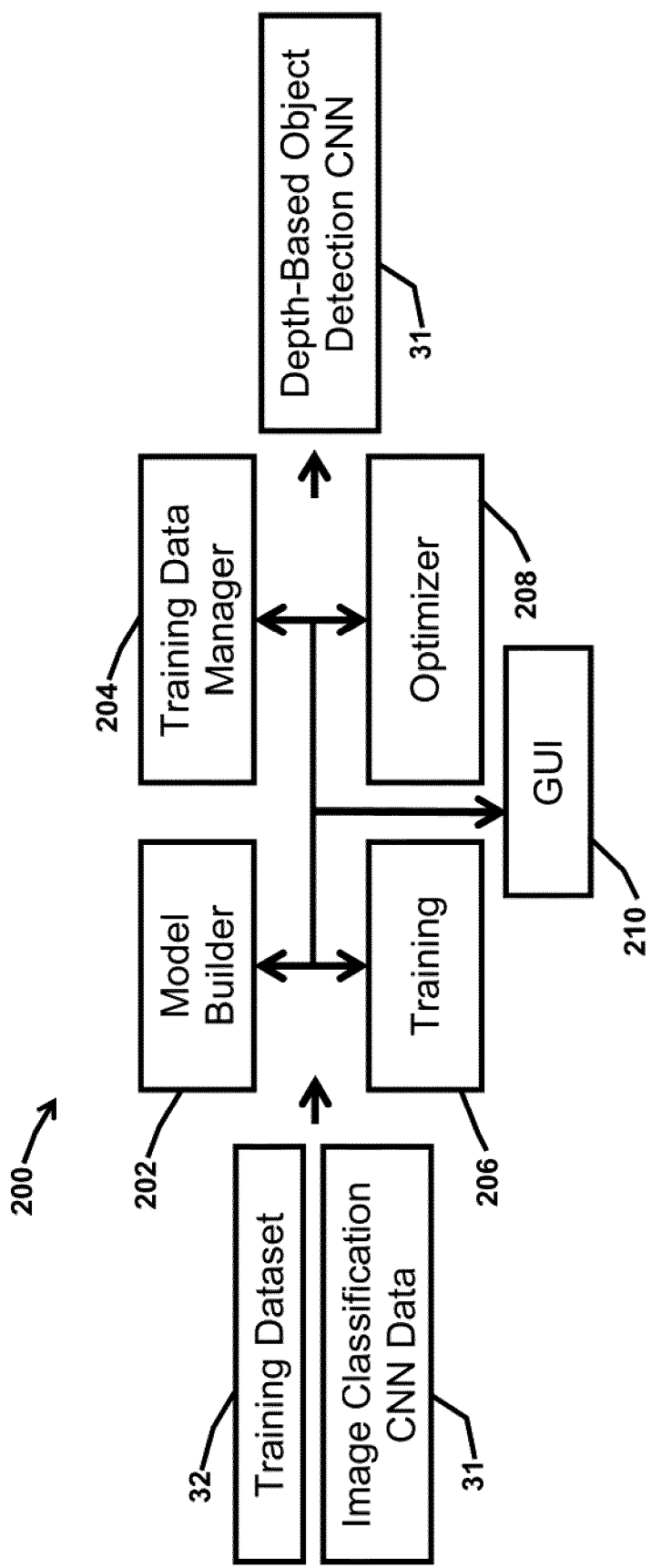
FIG. 2 shows a block diagram of functional components of the system of FIG. 1.

FIG. 2 depicts an exemplary embodiment of functional components 200 of the computing system 10 as implemented by the processor 14 with reference to the program instructions 24. Functional components can include hardware or a combination of hardware and software. In the description below, statements that an action is performed by or with functional components mean that a processor (e.g., the processor 14) executes corresponding program instructions (e.g. program instructions 24) to perform the stated action.

In FIG. 2, block 202 is a CNN model builder component, block 204 is a training data manager component, block 206 is a training component, block 208 is an OD-CNN optimizer component, and block 210 is a graphical user interface ("GUI") component, each of which is discussed in further detail below. In the system 10, the processor 14 implements the functions of the various components 202-210 in conjunction with other components and elements of the system 10 by executing corresponding program instruction 24 stored on the memory. As depicted in FIG. 2, the system 10 receives image classification CNN data 31 and training data 32, and outputs an OD-CNN 250 trained to detect objects in an input depth image.

Figure 3:
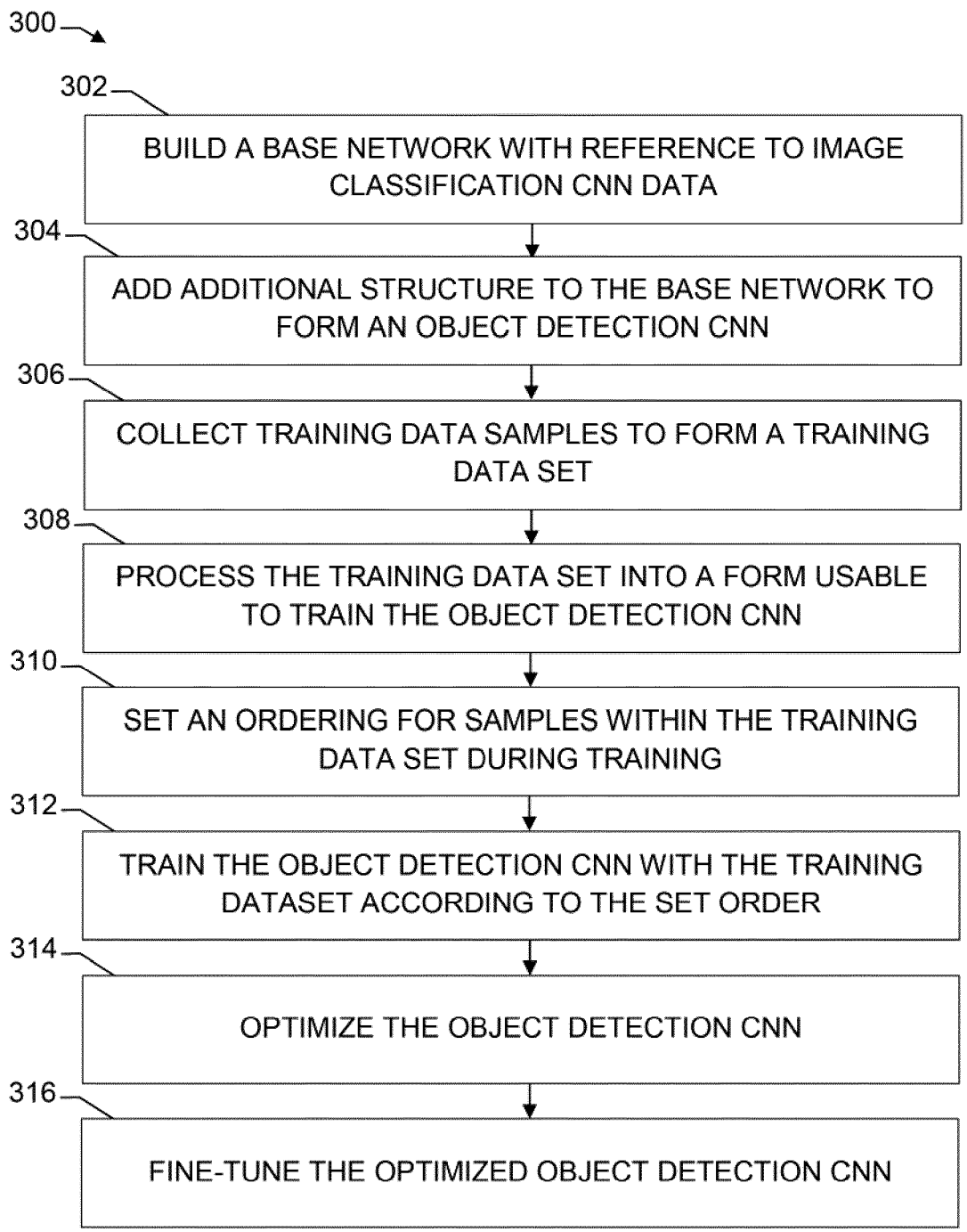
FIG. 3 shows a logical flow diagram for an exemplary embodiment of a method for building a depth-based object detection convolutional neural network using the system of FIG. 1.

FIG. 3 depicts a flow diagram of an exemplary embodiment of a method 300 for building an OD-CNN using the system 10. In the description of the methods herein, statements that a component is performing some task or function refers to a controller or general purpose processor (e.g., the processor 14) executing programmed instructions stored in non-transitory computer readable storage media (e.g., the memory 16) operatively connected to the controller or processor to manipulate data or to operate one or more components in the computing system 10 to perform the task or function. The controller or processor may be implemented with more than one processor and associated circuitry and components, each of which is configured to form one or more tasks or functions described herein. It will be appreciated that some or all of the operations the method can also be performed by a remote server or cloud processing infrastructure. Additionally, the steps of the methods may be performed in any feasible chronological order, regardless of the order shown in the figures or the order in which the steps are described.

At block 302, the CNN model builder component 202 builds a base network with reference to the image classification CNN data 31 and to the program instructions 24. At block 304, the CNN model builder component 202 adds additional structure to the base network to form an object detection CNN. At block 306, the training data manager component 204 collects training data samples to form the training dataset 32. At block 308, the training data manager component 204 processes the training dataset 32 into a form usable to train the object detection CNN. At block 310, the training data manager component 204 sets an ordering for the samples in the training dataset 32 to be provided to the object detection CNN. At block 312, the training component 206 trains the object detection CNN with the training dataset 32 according to the set ordering. At block 314, the OD-CNN optimizer component 208 optimizes the object detection CNN. At block 316, the OD-CNN optimizer component 208 uses the training component 206 to fine-tune the optimized object detection CNN to form the OD-CNN 250. Each of these operations is discussed in further detail below.

This method 300 improves upon the functioning of the computing system 10 and, more particularly, the functioning of the processor 14 of the computing system 10, by advantageously enabling the use of portions of CNNS for different modalities of data than for which the CNNs were trained. The method 300 advantageously utilizes programmatic processes to rapidly and efficiently collect and annotate training data samples for training a CNN. The OD-CNN 250 produced via the method 300 exhibits improved accuracy and a reduced computing power cost, and is operable in real time without a dedicated GPU, such as via a GPU embedded with a CPU as a System-on-a-chip (SOC). The OD-CNN 250 is also advantageously configured to detect objects at a variety of scales The CNN Model Builder Component The CNN model builder component 202 is configured to build a CNN model for object detection, with reference to the image classification CNN data 31 and to the program instructions 24 (blocks 302 and 304). As described in further detail below, the CNN model builder component 202 forms the object detection CNN model by building a base network 252 using the image classification CNN data 31 (block 302), and adding additional structure to the base network 252, with reference to the program instructions 24 (block 304). As used herein, a "base network" means at least one convolutional neural network layer configured to receive RGB image data as input, and configured to compute output data indicative of at least one feature of an object in the received RGB image data. As used herein, "additional structure" added to a base network means at least one additional convolutional neural network layer configured to receive data indicative of at least one feature of an object in RGB image data, and configured to compute output data indicative of a localization of the object within the RGB image data and of a classification of the object.

Building the Base Network—Block 302

As described in further detail below with reference to FIG. 4, an image classification CNN model 30 includes a feature-detection portion 60 and a classification portion 70. A "feature detection portion" is a subset of the convolutional layers of an image classification CNN that are configured to receive image data as input and compute data indicative of at least one feature in the received image data as output. A "classification portion" is configured to apply a classification to the received image data with reference to the at least one feature detected by the feature detection portion.

In some embodiments, the image classification CNN data 31 includes program instructions used to implement an image classification CNN and RGB training data. In such embodiments, building the base network 252 includes building an image classification CNN model by executing the program instructions with the processor 14, training the image classification CNN model with the RGMB image training data to form convolutional layer data with learned parameters, and extracting the convolutional layer data and learned parameters corresponding to the feature detection portion of the trained image classification CNN. In some embodiments, the convolutional layer data corresponding to the classification portion of the CNN is removed or deleted. In some embodiments, the trained image classification CNN is used as a base, and the convolutional layers of the classification portion are overwritten and/or replaced.

In some embodiments, the image classification CNN data 31 includes convolutional layer data with learned parameters for an image classification CNN. In such embodiments, building the base network 252 includes extracting the convolutional layer data and learned parameters corresponding to the feature detection portion of the trained image classification CNN. In some embodiments, the convolutional layer data corresponding to the classification portion of the CNN is removed or deleted. In some embodiments, the trained image classification CNN is used as a base, and the convolutional layers of the classification portion are overwritten and/or replaced.

In some embodiments, the image classification CNN data 31 includes convolutional layer data and learned parameters corresponding to the feature detection portion of a trained image classification CNN. In such embodiments, the image classification CNN data 31 is already in the form of a base network 252.

The feature-detection portion of any acceptable image classification CNN is usable to form the base network 252. For example, image classification CNNs with a feature-detection portion usable to form a base network include, without limitation, ZFNet, ThiNet, and any variant of the VGG network. For the purpose of illustrating how an image classification CNN is structured, as well as the structure of a base network 252, FIG. 4 depicts an exemplary model 30 of an image classification CNN similar to the VGG16 network.

CNNs and elements thereof are broadly considered machine learning models. As used herein, the term "machine learning model" refers to a system or set of program instructions and/or data configured to implement an algorithm, process, or mathematical model that predicts and provides a desired output based on a given input. It will be appreciated that parameters of a machine learning model are not explicitly programmed and the machine learning model is not, in the traditional sense, explicitly designed to follow particular rules in order to provide the desired output for a given input. Instead, the machine learning model is provided with a corpus of training data (e.g., the training dataset, discussed above) from which identifies or "learns" patterns and statistical relationships or structures in the data, which are generalized to make predictions with respect to new data inputs. The result of the training process is embodied in a plurality of learned parameters, kernel weights, and/or filter values that are used in the various layers of neural network that comprises the machine learning model to perform various operations or functions. In the description of CNNs, statements that a layer or some other component performs some process/function or is configured to perform some process/function means that a processor or controller (e.g., the processor 14) executes corresponding program instructions stored in a memory (e.g., the memory 16) with reference to the parameters, kernel weights, and/or filter values learned in the training process to perform the stated operation or function.

Figure 4:
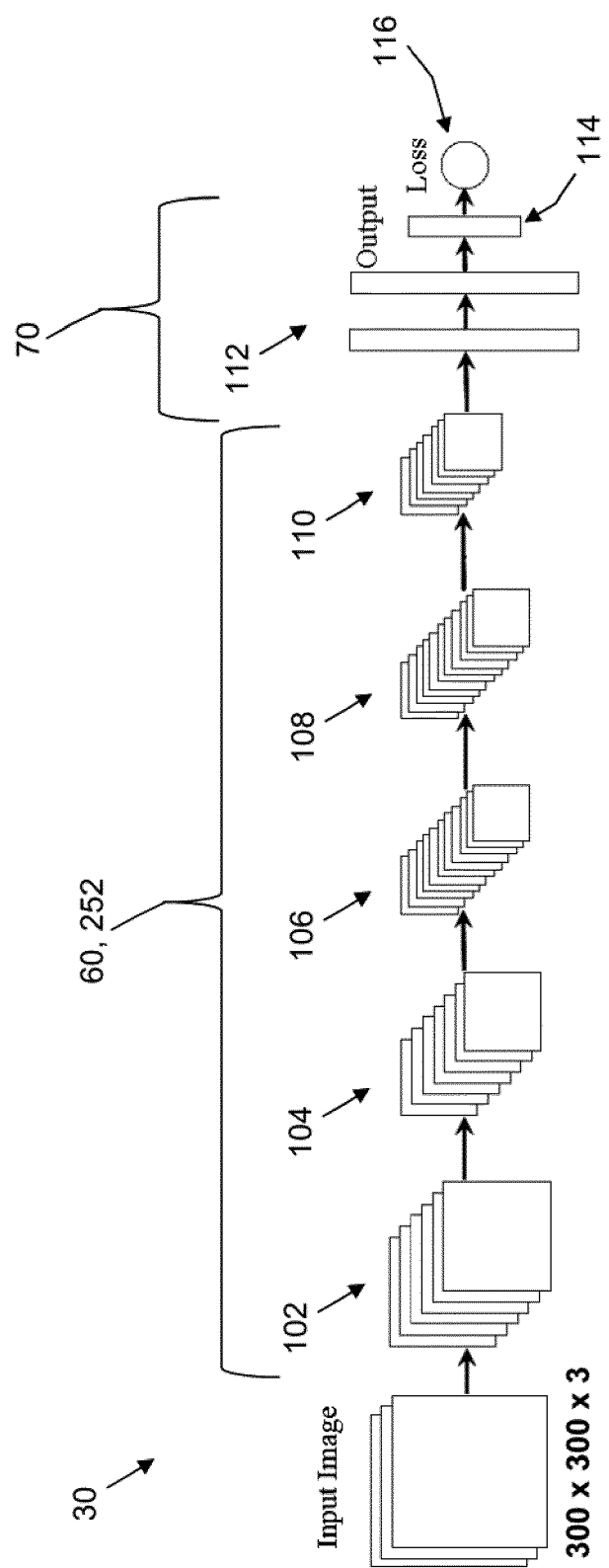
FIG. 4 shows an exemplary embodiment of a model of an image classification convolutional neural network.

The image classification model 30 in FIG. 4 is configured to receive two-dimensional (2D) input images 100, such as training images from an RGB image dataset as well as input RGB images to be classified. An RGB image is formed from an array of pixels, whereby an array is a matrix of data arranged in rows, columns, and levels. Each pixel includes respective values corresponding to the intensity of the colors red, green, and blue present at each location in the RGB image, and thus a 2D RGB image is represented by a three-dimensional (3D) matrix (m×n×3) of intensity values, each of the 3 levels corresponding to one of the red, green, and blue values, respectively, and the rows (m) and columns (n) corresponding to positions along the length and width of the image. Thus, an RGB image with a 300 pixel resolution is represented by a 300×300×3 matrix.

CNNs are a special type of feed-forward neural networks that contain a number of convolutional layers. A convolutional layer receives an input, such as the 300×300×3 matrix above, and applies one or more filters to the input in a convolutional manner as discussed below. A filter, also referred to as a neuron or kernel, is a matrix of weights, also referred to as parameters or filter values, whereby the weights collectively correspond to a "feature" of an image, i.e. a relative arrangement of pixels with certain relative values.

In a CNN, weights of filters are generally learned and/or optimized during a training process. In some embodiments, weights are initialized with random values, with values from prior training, or via any other acceptable initialization process such as the Xavier algorithm. This means that, prior to training, individual filters in a CNN do not correspond to any particular feature. Rather, via the training process, the weights of individual features are adjusted until the filters correspond to features representative of the training data.

Generally, a filter in a layer has as many levels as the input for that layer so that all channels of the input data (here red, green, and blue intensity values) are accounted for. The number of rows and columns in a filter's matrix defines the filter's "receptive field," or "kernel size," i.e. a discrete portion of an input that the filter is applied to in a convolutional manner in order to form discrete output values. For example, a 3×3×3 filter is applied to discrete 3×3×3 chunks of the 300×300×3 input matrix to produce discrete output values for each chunk. Each filter in a layer receives the entirety of the input of the layer as an input, and computes a single level as an output. Thus, a layer with a plurality of filters computes an output matrix with one layer per filter in the layer.

Applying a filter to a chunk includes multiplying the weights of the filter by the corresponding values in the chunk, and then summing all of the results to form a single output value. As a result, the magnitude of the output value acts as a feature identifier for that particular chunk. For example, if the relative magnitude and arrangement of the values in the chunk have a high correspondence to the weights in the filter, the output value will be higher, while if the relative magnitude and arrangement of the values in the chunk have a low correspondence to the weights, the output value will be lower.

The filter is applied to various chunks of the input matrix so that the filter is convolved over the entirety of the input matrix. The resulting output values are assembled together in a 1 level output matrix, whereby the output values are arranged in correspondence with the positioning of the chunks used to produce each output value. Because the magnitude of the output values are indicative of a probability that each chunk includes the feature corresponding to the filter, the output matrix is an activation map that indicates all of the locations in the input matrix that are likely to exhibit that feature.

The number of rows and columns in the output matrix is determined by the size of the receptive field of the filter, and the extent to which the chunks of the input matrix overlap with or are spaced apart from each other, whereby the spacing or overlap between chunks over the m and n dimensions is referred to as the "stride" of the filter. For a 3×3×3 filter, a stride of three means that subsequent chunks do not overlap, and so a 300×300×3 matrix input would result in a 100×100×1 output. A stride of one for a 3×3 filter would mean that two adjacent chunks have two overlapping rows or columns, and would result in a 298×298×1 output. In some cases, the input matrix and/or filter is padded with a surround of zero-value pixels so that the output matrix has a particular size. For example, adding a 1 pixel border surrounding a 300×300×3 to form a 302×302×3 input image prior to applying a 3×3×3 stride-1 filter would result in a 300×300×1 output.

As noted above, a single convolutional layer may include a plurality of filters. The outputs of each filter in the convolutional layer are stacked together to form a single output matrix. For example, a convolutional layer with sixty-four 3×3 3-stride filters would take the 300×300×3 matrix input and produce a 100×100×64 output.

The image classification CNN 30 in FIG. 4 includes five convolutional layers 102, 104, 106, 108, and 110. It should be understood that for subsequent layers, the output of a preceding layer acts as the input of the next layer. As a result, the features identified in subsequent convolutional layers represent a decrease in a level of granularity. As a dramatically simplified abstract illustrative example, a first convolutional layer might identify simple features like a gradient, while a second convolutional layer might identify lines or curves, a third might identify assemblies of lines and curves that form edges or corners, a fourth convolutional layer might identify shapes as assemblies of edges and corners, and so on.

In this model 30, each of the convolutional layers 102-110 is followed by a Rectified Linear Unit (ReLU) layer (not shown) that sets any negative output values of a preceding layer to zero. Zeroing out the negative output values decreases the linearity of the output which could otherwise lead to gradient loss over multiple layers and/or overfitting.

In some embodiments, one or more of the convolutional layers 100-110 is followed by a pooling layer (not shown). A pooling layer reduces the dimensionality of the respective outputs. In other words, a pooling layer reduces the resolution of its input by applying a filter with a stride set to the size of the filter so that there is no overlap between chunks. As a result, clusters of discrete features detected in a previous layer are grouped together, which can facilitate detection of higher-order features.

Various types of pooling layers are usable, including max pooling layers and average pooling layers. Rather than multiplying and summing the values in a chunk like a typical filter, a max pooling layer returns only the maximum value in the chunk. Conversely, an average pooling layer returns the average of all of the values in the chunk.

In some embodiments, the model does not include a pooling layer after one or more of the convolutional layers such as, for example, embodiments that control for dimensionality by adjusting the stride of filters in the convolutional layers 102, 104, and 110.

The output of the fifth convolutional layer 110 in the model 30 is provided to fully connected layers 112. A fully connected layer determines probabilities that features detected in a preceding layer are associated with each other. A ReLU layer (not shown) is also applied to the output of each fully connected layer 112. The output of the last fully connected layer is fed to a 1000-way soft-max output layer 114, which produces a probability distribution over 1000 different possible class labels for the input images 100. In other words, the soft-max output layer 114 produces probabilities that detected associations of features correspond to each of the possible class labels. Generally, the class label having the highest probability is taken as a likely classification, with the value of the probability taken as the confidence of the classification.

During training, training data in the form of a plurality of images, such as those of the RGB image dataset which are labeled with one of the 1000 different class labels, are provided to the image classification model 30. After a sample image in the training data is fed into the CNN 30, the highest of the probabilities produced by the soft-max output layer 114 for that sample image is taken as the possible class label for that sample image. A mismatch between the possible class label determined by the CNN 30 and the true class label for the sample image as listed in the training data is used to adjust the weights of the filters in the convolutional layer 102-110 and to the weights of the fully connected layers 112 according to a loss function 116.

As a high level illustrative description of this process, the loss between the possible class image and the true class label is fed backwards through the CNN. The result of the backwards-feeding of the loss indicates the contribution of the different weights in the various filters of the CNN to the loss. The weights identified by this process are adjusted according to a predetermined learning rate, with the result that the re-weighted filters are thus re-configured to produce a lower loss given the same training sample. In some embodiments, the identified weights are adjusted by multiplying each weight by $(1-\eta)$, where $\eta$ is the learning rate. In some embodiments, the learning rate $\eta$ is subtracted from each identified weight. Other acceptable adjustment techniques are also usable.

Generally, this process is conducted for a single sample image at a time. In other words, the weights of the various filters are adjusted after each subsequent sample image is fed into the CNN. Such a process is referred to as stochastic gradient descent. In some embodiments, however, a batch of sample images is fed through the CNN to produce a batch loss, and the weights are adjusted with reference to the batch loss.

By repeating this process over multiple training samples, the loss function is gradually reduced toward a convergent minimum, and the filters gradually learn and optimize weights indicative of distinctive features of the various classification labels. Generally, learning rates are relatively small, so that no individual training sample has a determinative effect on the CNN as a whole.

The learning rate $\eta$, along with the number, ordering, and types of the various layers in the model 30, and the amount of filters in each layer are referred to as hyper-parameters that vary over different embodiments of the model. In some embodiments, the learning rate $\eta$ is about 0.0001 to about 0.001, or more particularly about 0.0005. In some embodiments, the learning rate $\eta$ is modified over the course of multiple training samples, or over batches of samples, or the like. The modification can be stepwise, linear, exponential, or the like. In some embodiments, training a CNN includes an initial training round with a relatively higher learning rate $\eta$, followed by a fine-tuning training round with a relatively lower training rate $\eta$. A learning rate $\eta$ that is too high can lead to overfitting to training data, while a learning rate that is too low can reduce the rate of convergence to a minimum for the loss function. Overfitting refers to when a CNN is hyper-sensitive to the particular samples in the training data to the exclusion of any deviation of the training data, and limits the general applicability of the CNN.

In some embodiments, the model 30 further includes one or more dropout layers (not shown). A dropout layer sets a random sampling of output values from a preceding layer to zero. As a result, the CNN is configured to account for random variations from the training data, which can inhibit a CNN from becoming overfitted to the training data.

In some embodiments, the model 30 further includes one or more network-in-network layers (not shown). A network-in-network layer is a 1×1×N filter, where N is the number of filters applied in a previous layer. For example, applying a network-in-network layer to a 100×100×64 output flattens the output layer into a 100×100×1 single level matrix. A network-in-network layer can reduce the processing cost of subsequent convolution layers, and can also facilitate higher-order feature detection.

After training the image classification model 30, i.e. after continually adjusting the weights in the CNN until the mismatching between the possible class labels produced by the CNN and the actual labels of the data set converges to a stable minimum, the trained convolutional layers 102, 104, 106, 108, and 110 are operable as feature detectors with respect to an input image 100 with an unknown classification, and thus represent a feature-detection portion 60 of the image classification model 30. The trained fully connected layers 112 and soft-max layer 114 thus represent the classification portion 70 of the image classification model 30. As discussed above, CNN model builder component 202 forms a base network 252 from the feature-detection portion 60.

It will be appreciated that the illustrated image classification model 30 is merely exemplary, and that the number, type, and ordering of layers vary in different image classification CNNs. Further, while the layers in the model 30 are described as occurring sequentially, in some embodiments two or more layers operate in parallel. Thus, the number, type, and ordering of layers in the feature-detection portion, and thus the number, type, and ordering of layers in the base network 252, vary depending on the particular image classification CNN used to build and train the feature-detection portion 60.

Adding Additional Structure to the Base Network—Block 304

Returning to FIG. 3, as discussed above, in block 304, the processor 14 is configured to execute program instruction 24 corresponding to the CNN model builder component 202 to add additional structure to the base network 252 of an image classification CNN model in order to form an object detection CNN model. In other words, the additional structure added to the base network 252 converts, i.e. fine tunes, the base network 252 from operating as an image classifier to operating as an object identifier and localizer.

As discussed above, image classification differs from object detection in that classification is based on the presence and prevalence of features within an image-as-a-whole, while object detection requires not only detection of a feature corresponding to an object, but also localization of that feature within the image. However, both image classification and object detection are performed with reference to features within an image. Thus, techniques for building and training image classification CNNs can be adapted to object detection. Further, since the features that distinguish one object from another are similar to the features that are indicative of a classification for an image, the learned feature detection from an image classification CNN can be leveraged for object detection. Here, by adding additional structure to the base network 252, the CNN model builder component 202 uses the correspondence between relative pixel values and features learned by an image classification CNN, and build a CNN model configured for object detection.

Figure 5:
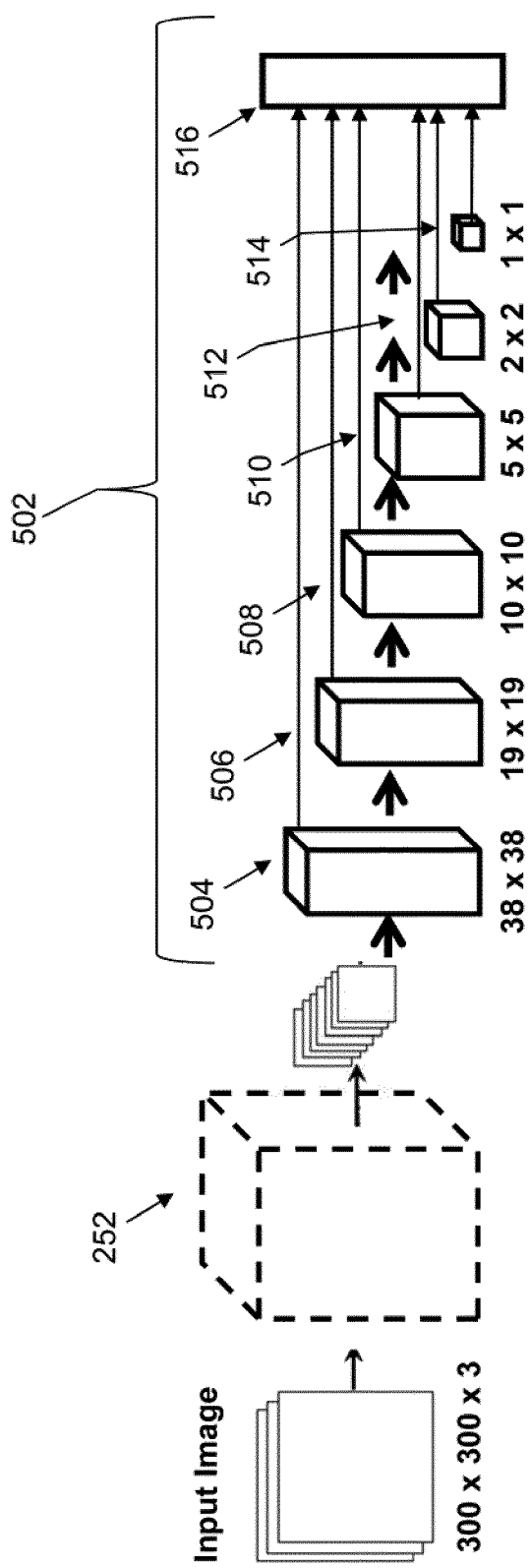
FIG. 5 shows an exemplary embodiment of a model of an object detection convolutional neural network.

Any acceptable type of fine-tuning a base network 252 for object detection is usable according to this disclosure such as, for example, YOLO, Faster-RCNN, MULTIBOX, etc. FIG. 5 depicts an exemplary model 500 of an object-detection CNN that includes a base network 252 fine-tuned for single-shot detection (SSD) of RGB images. The model 500 includes a base network 252 and additional structure 502 that follows after the base network 252.

The additional structure 502 includes a plurality of feature map layers 504, 506, 508, 510, 512, and 514, as well as a post-processing block 416. The feature map layers 504-514 are configured to detect, at different scales, features indicative of objects, and the post-processing block 516 is configured to identify and localize objects based on the detected features. In some embodiments, at least one of the feature map layers is formed by converting a convolutional layer of the base network 252 into a feature map layer. In some embodiments, at least one of the feature map layers is formed by converting a convolutional layer of the classification portion 70 of an image classification CNN into a feature map layer.

A "feature map layer" is a convolutional neural network layer that applies a plurality of filters to a feature map of an input image in a convolutional manner A "feature map" is formed from a grid of cells that represent sub-divisions of the input image. For example, a 4×4 scale feature map would include a square grid of sixteen cells, so that for a 300×300 input image, each cell represents a 75×75 sub-division of the whole.

Each of the feature map layers 504-514 has a progressively decreasing scale. In some embodiments, the scales of the feature map layers are regularly spaced apart. In the illustrated embodiment, the layer 504 has a 38×38 scale, the layer 406 has a 19×19 scale, the layer 508 has a 10×10 scale, the layer 410 has a 5×5 scale, the layer 412 has a 2×2 scale, and the layer 514 has a 1×1 scale.

Each cell in a feature map includes a respective set of bounding boxes of different aspect ratios. A "bounding box" is a region defining a potential localization of an object within an image. Each bounding box is centered on its respective cell, and has a height h and width w defined by its aspect ratio. For a scale s and aspect ratio a, the height h and width w of a bounding box are defined by:

$$w = s\sqrt{a}$$

$$h = s/\sqrt{a}$$

Aspect ratios a for bounding boxes can include, for example, 1, 2, 3, ½, ⅓, etc. An additional square bounding box can be defined by:

$$w = h = s' = \sqrt{s^2 + 1}$$

Different aspect ratios for a bounding box account for different shapes and perspectives of detected features, and thus an increased number of bounding boxes with different aspect ratios for each cell can lead to an increase in accuracy of feature detection.

The additional structure 502 further includes a network-in-network layer followed by a ReLU layer (not shown) for each feature map layer 504-514, and further includes pooling layers and padding (not shown) as needed to arrive at the scales listed above.

In operation, for each feature map layer, the processor 14 is configured to apply a respective set of 3×3 filters to each bounding box of each cell in a feature map. The set of filters for each bounding box includes four 3×3 filter that respectively compute an offset between each edge of the bounding box and a predicted edge of an object occupying the bounding box. The set of filters also includes a respective 3×3 filter for each class of object to be identified that computes a confidence score $c_p$, the value of which is indicative of a likelihood that the object occupying the bounding box belongs to a particular class p. In other words, for a model configured to detect P different classes of object, the set of filters for each bounding box includes P class filters that each computes a respective confidence score $c_p$. Thus, if each cell in a feature map includes k bounding boxes of different aspect ratios, and the feature map includes m×n cells, then the total number of filters in the feature map layer is defined by:

$$\text{filters}_{layer} = k \times m \times n \times (P+4)$$

Each feature map layer thus outputs a matrix that defines, for each cell in the feature map, a predicted localization of an object relative to the cell as defined by the offsets, and a set of scores $c_p$ indicative of likely identifications of the object. Since each feature map layer is at a different scale, the objects identified by a particular feature map layer are objects of corresponding scale. Thus, the outputs of a plurality of feature map layers enable the identification and localization of objects at a variety of scale.

Unlike an image classification CNN, whereby an input is progressively collapsed down into a single output, multiple feature map layers in the model 500 are usable as outputs in combination. In other words, the outputs of multiple feature map layers are combined so that objects of various localizations, scales, and aspect ratios are accounted for. Thus, in this embodiment, in addition to the output of each feature map layer 504-512 acting as an input to the next succeeding layer, the output of each feature map layer 504-512 is also fed in parallel with the output of the last feature map layer 514 to the post-processing block 516.

The output of the feature map layers 504-514 may include multiple bounding boxes that correspond to the same object in the input image. For example, portions of the object may occupy multiple bounding boxes, and thus multiple bounding boxes have confidence scores indicative of the presence of the object. In another example, an object may be of a size that is detected by multiple bounding boxes of different scales. The post-processing block 516 is configured to receive the output of the feature map layers 504-514 as input, determine bounding boxes that are likely to be redundant and refer to the same object, select a bounding box that optimally corresponds to the object, and suppress the other redundant bounding boxes.

In some embodiments, prior to selecting optimal bounding boxes for each object of class p, the post-processing block 516 reduces the number of bounding boxes to consider by suppressing bounding boxes having a confidence score $c_p$ below a predetermined threshold. Boxes with a confidence score below the threshold are considered unlikely to contain an object or portion of an object of class p, and thus can be removed from the potential selection of a bounding box that optimally corresponds to the object of class p. In this embodiment, the predetermined threshold for the confidence score is 0.01.

To suppress such redundant detections of an object of class p in multiple bounding boxes, the post processing block 516, via operation of the processor 14 with reference to the program instructions 24, performs a non-maximum suppression process. A non-maximum suppression process includes (i) determining, from the bounding boxes remaining from the confidence thresholding suppression above, clusters of bounding boxes that overlap each other by a predetermined threshold, and (ii) suppressing all of the bounding boxes in each cluster but for the one having a highest class confidence score $c_p$ in the respective class.

In this embodiment, overlap between bounding boxes is determined via jaccard overlap, i.e. IoU computation, but any acceptable overlap calculation is usable. In this embodiment, the predetermined threshold for jaccard overlap is set to 0.45. The post-processing block 516 outputs the bounding boxes persisting through the non-maximum suppression process as identifications and localizations of the respective object class p.

In some embodiments, the post-processing block 516 is further configured to rank the bounding boxes persisting through the non-maximum suppression process by confidence score $c_p$, and eliminate all but a predetermined number of the highest confidence score $c_p$. In some embodiments, the post-processing block 516 is configured to produce a modified copy of the input image that additionally includes annotations in the form of a visual depiction of the output bounding boxes and/or a text label corresponding to the respective object class p.

As discussed above, the filters for each feature map layer 504-514 are configured to detect features at different scales. In addition to enabling the detection of features of different sizes in an object, such configuration also enables the detection of the same class of objects at different scales. For example, consider the same object held at different distances from a sensor, or objects of the same class but of different sizes. In either case, similar features of different scales are indicative of the same object class. In some embodiments, the object classification filters used on the different feature map layers 504-514 are globalized.

In other words, a common set of learned filters is used as the filters for each feature map layer in the additional structure. In some embodiments, separate sets of filters are used for each layer and then, after training, the filters of one or more of the layers 504-514 are combined into a single set of common filters used for each feature map layer 504-514. Globalization of one or more of the feature layers facilitates detection of objects at various scales, and in particular can facilitate detection of objects at scales that may not be represented in the training data.

The Training Data Manager Component

Returning to FIG. 3, the processor 14 is configured to execute program instructions 24 corresponding to the training data manager component 204 in order to collect training data samples to form the training dataset 32 (block 306), process the training dataset 32 into a form usable to train the object detection CNN (block 308), and set an ordering for the samples in the training dataset 32 to be provided to the object detection CNN (block 310).

As discussed above, the CNN model 500 formed by the CNN model builder component 202 is configured for object detection. However, the CNN model 500 is initially untrained. In other words, even though the base network 252 within the model 500 includes the learned parameters from the image classification CNN and is thus trained, the filters within the feature map layers 504-514 are added in an untrained state. Thus, before the CNN model 500 can effectively operate as an object classification CNN, the model 500 needs training.

However, the training data needed to train a CNN for object detection is not the same as the training data need to train a CNN for object detection. As discussed above, image classification involves computing a classification of an image as a whole. As a result, training data for image classification includes an image and an associated true classification. Training images are fed into an image classification CNN, which produces an output likely classification, and a mismatch between the output classification and the true classification for each training image is used to adjust the weights within the CNN. In comparison, an object detection CNN does not merely apply a single classification to an input image. Rather, an input image may have any number of different classes of objects. Thus, training data with additional information is needed.

Specifically, training data for an object detection CNN requires a ground truth identification and localization for each object in each training image. In other words, each training image requires an annotation in the form of a ground truth boundary box surrounding each object in the image along with a label that links the ground truth boundary box with the object class of that object.

Many applications of object detection pertain to a particular set of object classes. To be effective in such cases, a CNN requires training data that includes samples with the desired set of object classes. Moreover, objects may have different features when viewed from different view perspectives, e.g. top view vs. side view vs. perspective view, etc. Thus, the training data, to be effective, also needs to depict the desired class of objects from the view perspective to be used in a particular application.

Since the training data required for an effective object detection CNN is highly specific, and object-annotated RGB data has not been widely available, the use of non-RGB-based CNNS generally includes at least some training data collection and/or labeling. Thus, efficient and rapid techniques for collection of non-RGB training data would be beneficial.

Collecting Samples of Training Data—Block 306

In block 306 of FIG. 3, the processor 14 is configured to execute program instruction corresponding to the training data manager component 204 to at least partially programmatically annotate image samples to form a training dataset with ground truth boundary boxes that localize objects in the sample images, as well as classification labels that identify the class of each object. Any acceptable at least partially programmatic annotation process is usable. In this embodiment, the image samples are depth images that are used to form the training dataset 32 having annotated depth images. Other images of other data types are also usable in other embodiments.

Figure 6:
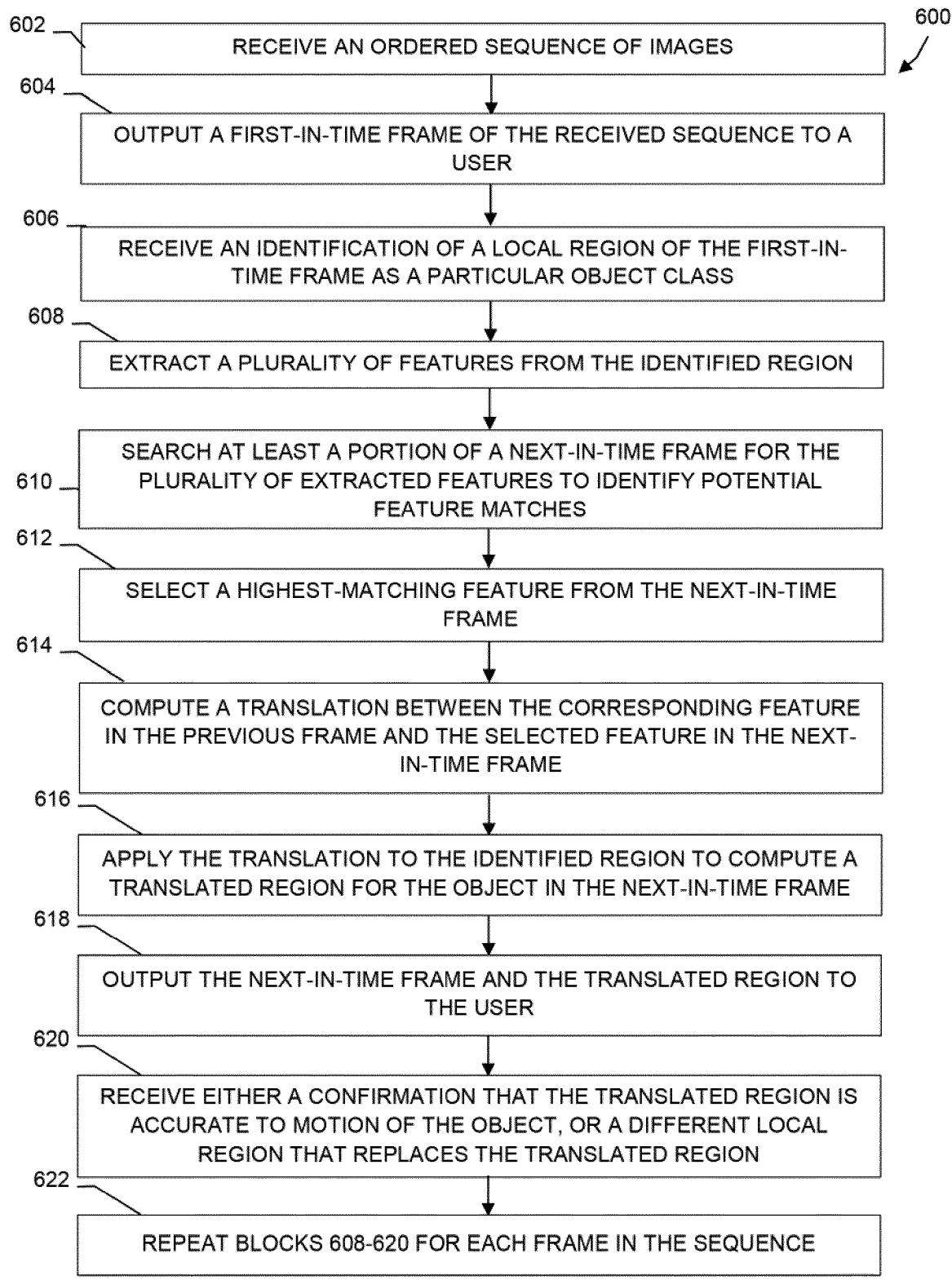
FIG. 6 shows a logical flow diagram for an exemplary embodiment of a method for forming a training dataset with annotated image data using multi-instance learning.

FIG. 6 depicts a flow diagram of an exemplary embodiment a method of using multi-instance learning (MIL) for forming a training dataset with annotated image data. MIL is a process that at least partially programmatically augments manual annotation of training data entered via a human user by applying object tracking to an at least partially manually annotated image stream.

At block 602, the processor 14 receives an ordered sequence of images, such as a video file, sequence of key frames, or the like. In this embodiment, the images are depth images. At block 604, the processor 14 operates the display 18 to output a first in time frame of the received sequence to a user. At block 606, the processor 14 receives a user selection identifying a local region of the first frame as a particular object class with the GUI component 210 via the user interface 20.

At block 608, the processor 14 extracts a plurality of features from the identified region. Any acceptable extraction process is usable, such as feature extraction via a pre-trained feature-detection portion of a CNN, via conventional feature detection techniques such as gradient, hue, and shape detection or the like. At block 610, the processor 14 searches at least a portion of a next frame for each of the plurality of features to identify a plurality of potential feature matches. For example, in some embodiments, the processor 14 searches a portion of the next frame centered around a location corresponding to the location of the identified region in the previous frame.

At block 612, the processor 14 selects a one of the plurality of potential feature matches having a highest matching to its corresponding feature in the set of features extracted from the previous image. At block 614, the processor 14 computes a translation, i.e. a change in location, between the corresponding feature in the previous frame and the selected best matching feature in the next frame. At block 616, the processor 14 applies the translation to the identified region in the previous frame to compute a translated region for the object in the next frame.

At block 618, the processor 14 outputs the next frame of the sequence, along with the translated region, to the user via the display 18. At block 620, the processor 14 receives, e.g. from the user via the GUI component 210, either a confirmation from the user that the translated region is accurate to the motion of the object between the previous frame and the next frame, or a different local region that replaces the translated region. At block 622, the method repeats blocks 608-620 until regions have been computed for each frame in the sequence. As a result, each of the frames in the sequence includes an object classification label and a corresponding localization for that object.

In some embodiments, the user identifies a plurality of different local regions within an image as different objects. In some embodiments, the training data manager component 204 is configured to track the motion of a plurality of objects in parallel. In some embodiments, the processor 14 forms a respective copy of each frame for each object identified in the frame, and performs the method above for each object.

In some embodiments, the processor 14 proceeds directly from block 618 to block 622 unless and until the user halts the process in order to redraw the identified region. This can significantly increase the speed of the method, while still maintaining a relative accuracy of the annotations of the frames.

In some instances, the translated region does not exactly correlate to the motion of an object between frames. In other words, the user may indicate that the translation region is accurate to the motion of the object between frames when there is at least some divergence between the translation region and the motion of the object. Such divergence introduces noise into the annotation of the training data for that object. However, rather than being detrimental, such noise operates similarly to the image augmentation techniques discussed above, and results in a more diverse training dataset that enables a more generalized and robust CNN.

As discussed above, annotated image data is formed from a sequence of image frames such as a video file, or the like. Since a video file generally includes many frames per second, a relatively short video file enables the collection of a large number of training samples. For example, a depth sensor capable of taking samples at 15 FPS enables the collection of 108,000 samples from just 2 hours of depth video footage. Moreover, because the MIL process programmatically predicts the translation regions for the motion of an object, a user can very rapidly process a large amount of samples.

Thus, the MIL method discussed above is usable to rapidly and efficiently produce a large number of training data samples from a relatively short input sequence of frames. Therefore, the low availability of non-RGB training data is no longer limiting factors to training a CNN for object detection.

Processing the Training Dataset into a Form Usable to Train the Object Detection CNN—Block 308

Returning to FIG. 3, in block 308, the processor 14 is configured to execute program instruction corresponding the training data manager component 204 to process the training dataset 32 into a form usable to train the object detection CNN model 500. This includes (i) processing the image data into a form that can be fed into the object detection CNN model 500, and (ii) processing the true object localization and classification labels into a form that can be interpreted against the prediction results of the object detection CNN.

i. Processing the Training Image Data

Recall that the base network 252 is trained using RGB image data. As a result, the base network 252, and thus the model 500, is not adapted to operate on modalities of image data other than RGB image data. Further, conventional efforts to modify an RGB-based CNN to enable the use of other image modalities have met with limited success.

As discussed above, such conventional efforts generally rely on paired data, whereby each RGB image is paired with an image of another modality. Paired data has several disadvantages. Specifically, collecting a training sample of paired data requires collecting not only an RGB image but also an image in the other modality taken at the same time and from the same perspective view. The use of paired data may also require modifications to the CNN model that increase the complexity and computing power needs of the model. Moreover, such conventional techniques have done little to increase the accuracy of object detection CNNs relative to RGB-only systems, or to decrease the computing power needed to process input images for object identification.

Described below are exemplary techniques that enable a CNN configured to be trained for operation with a non-RGB modality of data without any need for paired training data, and without additional modification to the structure of CNN model. In this embodiment, the non-RGB data is in the form of un-paired depth images. Also described below are techniques for decreasing the computing power needed for processing input images for object detection. Further described below are techniques for improving the accuracy of object detection CNNs. While these techniques are described with reference to depth data, thee techniques are also applicable to other modalities of image data such as ultra-sound, infra-red, x-ray, etc.

As discussed above, the memory 16 of the system 10 includes training dataset(s) 32 composed of un-paired depth images with labels identifying objects within the depth images that represent classes of objects to be detected by the OD-CNN. A depth image, unlike an RGB image with red, green, and blue data channels, only has one channel of information. Thus, a 300 pixel resolution depth image is represented by a 300×300×1 matrix.

To enable the use of single data channel depth image data in a CNN with a base network 252 trained on three channel RGB data, the processor 14 is configured to execute program instruction corresponding the training data manager component 204 to reformat depth image data as RGB data by reproducing the single channel of the depth data into three identical channels. In other words, a 300×300×1 matrix for an input depth image is reformatted as a 300×300×3 matrix with three identical levels. The resulting tri-channel depth data enables depth images to be directly applied to convolutional layers trained on three channel RGB data.

In some embodiments, the processor 14 is further configured to further reformat depth data as RGB data by applying a smoothing process to the depth data. Generally, each value in RGB data ranges from 0 to 255, corresponding to an intensity of red, green, or blue light. Conversely, depth images taken via depth sensors can have a high accuracy and/or a large range of potential values. In one example, a depth sensor takes depth images with 512×424 resolution, has a maximum range of over 2.4 meters, and is precise to the nearest millimeter. As a result, a single pixel of a resulting depth image can range in value from 0 to about 8000, which is about 32 times the range for an RGB value. Thus, by dividing each value of depth image data by a factor of 32, the training data manager component 204 fits the depth image data to the scale used by RGB data. Other division factors are used in other embodiments, such as for depth sensors with other ranges for depth values. Additionally, such division results in some smoothing of the depth data which may otherwise be noisy and/or more granular than necessary for object detection.

In some embodiments, the processor 14 is further configured to perform other operations on depth images in the training dataset(s) 32, including resizing images to a predetermined resolution, as well as performing data augmentation techniques such as forming new samples from patches of existing samples, flipping an image, and/or adding distortion.

ii. Processing the Labels on the Training Image Data

As discussed above, an object detection CNN model is trained by determining loss between true and predicted object localizations and classifications. Recall that for the model 500, the predicted outputs are in terms of confidence scores and offsets for various bounding boxes in various feature maps. Thus, for the model 500, a loss between true and predicted object localization and classifications is expressed as a weighted sum between a confidence loss $L_{conf}$ based on the difference between true and predicted confidence scores, and a location loss $L_{loc}$ based on the difference between true and predicted offsets, i.e.:

$$L(x, c, l, g) = \frac{1}{N}(L_{conf}(x, c) + \alpha L_{loc}(x, l, g))$$

where N is the number of bounding boxes matched to ground truth boxes, a is a weight applied between the confidence loss and location loss, x is a set of indicators marking whether a particular predicted bounding box l is matched to a particular ground truth boundary box g, and c is a set of confidence scores for the bounding boxes l for each object class, i.e. $c=[c_I, \ldots, c_P]$. If N=0, the loss is set to zero. In this embodiment, a is set to 1. Through application of the training dataset 32 to this loss function, the annotations in the dataset 32 are expressed in a form that corresponds with the output of the CNN model.

A ground truth boundary box expressed in terms of bounding boxes is the set of bounding boxes that have locations corresponding to the location of the ground truth boundary box, i.e. a set of true bounding boxes. The processor 14 determines the set of true bounding boxes for a given ground truth boundary box by computing the bounding boxes from each feature map layer of the CNN model 500 that have a jaccard overlap with the ground truth boundary box over a predetermined threshold. In other words, each bounding box of each feature map in the CNN is categorized as either a positive match to a particular ground truth boundary box and added to the set of true bounding boxes, or categorized as a negative match and excluded from the set. In this embodiment, the predetermined threshold for the ground truth boundary box jaccard overlap is 0.5. The set of true bounding boxes matched to the ground truth boundary box (i∈Pos) and the set of unmatched bounding boxes (i∈Neg) are used to compute the confidence loss and the location loss.

In this embodiment, confidence loss is given by a softmax operation over multiple class confidences c, i.e.:

$$L_{conf}(x, c) = - \sum_{i \in Pos}^{N} x_{ij}^p \log(\hat{c}_i^p) - \sum_{i \in Neg}^{N} \log(\hat{c}_i^0)$$

where $x_{ij}^p$ is the set of binary classification indicators of whether an i-th true bounding box is matched to the j-th ground truth boundary box of category p, where $$\hat{c}_i^p = \frac{\exp(c_i^p)}{\sum_p \exp(c_i^p)}$$

and where $c_i^p$ is the predicted confidence score for the i-th bounding box in the object category p.

In this embodiment, location loss is given by the Smooth L1 loss between a predicted bounding box l and a ground truth boundary box g, i.e.:

$$L_{loc}(x, l, g) = \sum_{i \in Pos}^{N} \sum_{m \in \{cx,cy,w,h\}} x_{ij}^p \text{smooth}_{L1}(l_i^m - \hat{g}_j^m)$$

whereby:

$$\hat{g}_j^{cx} = (g_j^{cx} - d_i^{cx})/d_i^w$$

$$\hat{g}_j^{cy} = (g_j^{cy} - d_i^{cy})/d_i^h$$

$$\hat{g}_j^w = \log\left(\frac{g_j^w}{d_i^w}\right)$$

$$\hat{g}_j^h = \log\left(\frac{g_j^h}{d_i^h}\right)$$

where a true bounding box d is regressed via its offsets to determine its centers cx and cy, as well as its width w and height h, and where $x_{ij}^p$ is indicator that, given an object class p, is 0 or 1 depending on whether the i-th true bounding box d is matched to the j-th ground truth boundary box g.

In some instances, the number of negative matching bounding boxes far exceeds the number in the set of true bounding boxes. An excess of negative examples can lead to a less stable training process and increased training time. In some embodiments, the negative matching bounding boxes are ranked by their individual confidence loss, and only a highest portion of the negative results so that a predetermined ratio of positive to negative matches is below a predetermined threshold. In this embodiment, the ratio of positive to negative results is held to at most 3:1.

Thus, via the above operations, the processor 14 expresses the annotations from the training dataset 32 in terms of the loss function for the object detection model 500. It should be understood that other loss functions, and thus other expressions of the annotations, are also used in other embodiments.

Organizing the Training Data—Block 310

Referring again to FIG. 3, in block 310, the processor 14 is configured to execute program instruction corresponding to the training data manager component 204 to set an ordering for the samples in the training dataset 32 to be provided to the object detection CNN. This includes determining a complexity of different samples in the training dataset 32, and arranging the samples in the training dataset 32 in an ordering based on sample complexity.

The order in which training samples are provided to a CNN during training can increase the accuracy of a resulting trained CNN. In a deep neural network, the convergence of a loss function to a minimum value has a highly non-convex shape. In other words, the path that the loss takes toward a minimum is highly non-linear depending on the particular impact of various training samples on particular weights. As a result, the order in which samples of training data are fed into a CNN can affect not only the rate of convergence of the loss function, but also the accuracy of the resulting CNN. However, the large sample size of training data and the convolutional relation between samples and particular weights in a CNN make the problem of determining an optimal ordering of training data samples into a virtually unsolvable problem.

Curriculum learning is a technique by which training data is grouped together and/or introduced to a CNN in order of sample complexity, also referred to as sample difficulty. The grouping of training data samples, and the order in which groups are fed into the CNN during training, is referred to as a curriculum. By training a CNN according to a curriculum, filters are configured to learn features in a progressive scale of granularity. As a result, fine-grained features that may otherwise be obscured by less granular features can be learned.

Various metrics for sample complexity are usable. In some embodiments, samples are ranked based on signal noise within the sample. However, for datasets all taken from the same sensor, the range of noise amongst samples may be low. In some embodiments, each sample in the training data set is fed through an untrained CNN, i.e. in each case the weights are set to the same initialized values, and the complexity of each sample is taken as the loss for that particular sample. In some embodiments, the samples are stratified based on classes of objects contained in each sample. For example, in an application configured to detect humans as well as items held by the humans as the humans walk through a doorway, the humans can be considered more complex relative to the items due to the relatively higher variation in shape in a human during walking relative to a held item with a generally consistent shape.

Various types of orderings based on sample complexity are also usable. In some embodiments, during a single training process, samples are arranged into a continuous curriculum of escalating difficulty. In other words, the samples are arranged with the lowest difficulty sample first in order of ascending difficulty. In some embodiments, samples are arranged in batches, with each batch having an ascending difficulty threshold. Training is conducted multiple times, with an additional batch of more difficult samples introduced each time. In some embodiments, a highest difficulty set of samples is segregated out from the training data set. Training is conducted twice, once without the highest difficulty samples, and once with the full training data set. In some embodiments where training is performed multiple times, the learning rate for adjusting weights is decreased for each consecutive training process in order to inhibit the progressively more difficult samples from having an undue influence on the learning.

In this embodiment, objects of a particular class, i.e. human Persons, are predetermined to be of relatively higher complexity than the other object classes to be detected. Thus, in this embodiment, the processor 14 is further configured to separate the training dataset 32 into a batch of higher complexity samples that include objects in the Person class, and into a batch of lower complexity samples that do not include objects in the Person class. The processor 14 is additionally configured to set a curriculum for the training of the CNN model 500 with reference an ordering of the separation of the training dataset 32 in ascending complexity, e.g. first supplying the low complexity batch during training, and then supplying the complete dataset 32.

The pseudo-code below illustrates an exemplary embodiment of such a curriculum, whereby the training dataset 32 is separated into a low complexity batch $D_1$ with no Person objects and a high complexity batch $D_2$ that include Person objects.

Training CNN with Curriculum Learning

1: Input: Input Dataset D = {$D_1$,$D_2$}
2: i=1
3: $D_{train}$ = $\Phi$
4: Initialize network parameters W using Xavier algorithm
5: while (i<=2) do
6:   $D_{train}$ = $D_{train}$ ∪ $D_i$
7:   while (not converged) do
8:     Perform training, train($D_{train}$, W )
9:   end while Training CNN with Curriculum Learning 10: Select best W*;
11: Update learning Rate;
12: i = i + 1
13: end while
14: Output: Optimal Model Parameter W Curriculum learning can not only improve the accuracy of a resulting trained CNN, but also can decrease the time needed to perform the training process.

The Training Component—Block 312

In block 312, the processor 14 executes program instructions 24 corresponding to the training component 206, with reference to the training dataset 32, expressed in terms of the loss function of the CNN model 500, to train the filters in the model 500. In this embodiment, the processor 14 applies the curriculum for the training dataset 32 according to the pseudo-code discussed above. It should be understood that in other embodiments, the training component 206 applies different curriculums or does not apply a curriculum to the training of the CNN model 500.

Recall that the base network 252 includes filters with weights that have already been trained. In order to maintain the learning transferred from the prior training, in some embodiments, the training component 206 freezes the weights of the filters within the base network 252 while training the filters in the additional structure 502.

In this embodiment, the weights of the filters in the feature map layers 504-514 are initialized with the Xavier algorithm, and are updated for each training data sample, i.e. according to stochastic gradient descent. Other embodiments use other acceptable types of descent. In this embodiment, in the curriculum above, the learning rate when training just the $D_1$ sample set initialized at 0.00050, and the learning rate for the complete data set 32 is initialized at 0.00025. In each case, the learning rate is adjusted with a 0.9 momentum and 0.0005 weight decay for each batch of 32 samples.

The OD-CNN Optimizer Component

In some embodiments, after the training of the filters in the CNN model 500, such as via the procedure discussed above, the OD-CNN optimizer component 208 is configured to apply post-training optimization to the filters in the CNN model 500 (block 314), and fine-tune the optimized model 500 (block 316).

Post-Training Filter Optimization—Block 314

In some instances, several filters in a particular layer may be adapted to detect features that at least partially overlap in scope with each other, and thus such filters may be at least partially redundant of each other. In some instances, a particular feature has a low or negligible impact on the ultimate classification of a region of an image as an object. Optimizing a CNN in order to address such redundancies and low impact filters can improve the performance of a resulting CNN.

For each layer of the CNN model 500 that includes filters, i.e. convolutional layers and pooling layers, the processor 14 is configured to execute program instructions 24 corresponding to the OD-CNN optimizer component 208 to determine a subset of the filters within that layer which are representative of the layer as-a-whole within a predetermined threshold. In other words, the processor 14 determines a sub-set of filters that are operable to achieve an output that is similar to the full set of filters in the layer. The processor 14 is further configured to prune the non-representative filters from the layer. By reducing the number of filters in the layer, the processing needed to apply the layer to an input image is reduced.

Any acceptable type of filter post-processing is usable. In this embodiment, the OD-CNN optimizer component 208 includes an application of sparse coding-based filter pruning for each layer in the CNN model 500 that includes filters, and then fine-tunes the pruned CNN model 500 to produce an OD-CNN 260.

In applying sparse coding-based filter pruning, the processor 14 represents each filter within the layer as a flattened single-level matrix. In an example, a particular layer includes 64 filters that each have dimensions of 3×3×3. Each 3×3×3 filter includes 27 individual values, and thus can be expressed as a single dimension vector with 27 values. With the single dimension vector of each filter taken as a particular column of a matrix, the 64 filters are thus expressed as a single level 27×64 matrix.

Expressed formulaically, if each filter has B total values, and the layer has N total filters, and an i-th filter within the layer is denoted as $x_i$, a matrix $X \in \mathbb{R}^{B \times N}$ representing all of the filters within the layer is expressed as:

$$X = \{x_i \in \mathbb{R}^B, i=1, \ldots, N\}$$

To establish a filter level sparsity, $L_1$ regularization is performed on rows of a selection matrix defined by:

$$Z \in \mathbb{R}^{N \times N}$$

Thus, the non-zero rows of the matrix Z are given by $\|Z\|_{2,0}$ for:

$$\min \|X - XZ\|_F^2 \, s.t. \, \|Z\|_{2,0} \leq \tau$$

where $\tau$ is the tradeoff parameter. However, solving within the above constraint is an NP-hard problem due to the requirement of searching over every subset of the $\tau$ columns of X.

A relaxation of the above constraint is given by:

$$\min \|X - XZ\|_F^2 \, s.t. \, \|Z\|_{2,1} \leq \tau$$

where $Z \in \mathbb{R} R^{N \times N}$ is the sparse coefficient matrix, and the row sparsity regularizer, i.e. the sum of $l_2$ norms of the rows of Z, is given by:

$$\|Z\|_{2,1} \triangleq \sum_{i=1}^{N} \|z_i\|_2$$

Minimization of this relaxed constraint results in a sparse solution for Z in terms of rows, i.e. the sparse coefficient matrix Z contains a group of non-zero rows that constitute a representative set of the whole. Such minimization is a convex optimization problem.

While various optimization techniques are usable, in this embodiment, the processor 14 is configured to apply an Alternating Direction Method of Multipliers (ADMM) framework. Using Lagrange multipliers, the above optimization problem is expressed as:

$$\min \|X - XZ\|_F^2 + \lambda \|Z\|_{2,1}$$

where $\lambda$ is the tradeoff parameter associated with sparsity and diversity regularization. Using ADMM with an auxiliary variable A results in:

$$\min \|X - XA\|_F^2 + \lambda \|Z\|_{2,1} \, s.t. \, A = Z$$

An augmented Lagrangian written as a function of primal variables Z and A and a dual variable A, with both linear and quadratic terms results in:

$$L_p(A, Z, \Lambda) = \frac{1}{2}\|X - XA\|_F^2 + \lambda\|Z\|_{2,1} + \Lambda^T(A - Z) + \frac{p}{2}\|A - Z\|_F^2$$

Performing a derivative of the above with respect to each variable and equating to zero results in the following ADMM iterations:

$$A^{(t+1)} := (X^T X + pI)^{-1}\left(X^T X + p\left(Z^{(t)} - \frac{\Lambda^{(t)}}{p}\right)\right)$$

$$Z^{(t+1)} := S_{\lambda/p}\left(A^{(t+1)} + \frac{\Lambda^{(t)}}{p}\right)$$

$$\Lambda^{(t+1)} := \Lambda^{(t)} + p(A^{(t+1)} - Z^{(t+1)})$$

The minimization with respect to $l_{2,1}$ norm is defined as:

$$S_\mu(z) = \max\{\|(z)_2 - \mu, 0\}\frac{Z}{\|z\|_2}$$

Applying the foregoing, the OD-CNN optimizer component 208 iteratively computes values for the selection matrix Z, and selects columns of X corresponding to the non-zero rows of Z. The selected columns of X form a new matrix Y where $$Y = \{y_i \in \mathbb{R}^B, i=1, \ldots, K\}$$

Since the columns of Y do not include the zeroed rows of X, K is less than N, representing a decrease in the number of filters. Each column of Y is a single dimension vector of length B that can be unpacked to form an m×n×p filter, in order to form K filters that replace the filters in the given layer. Adjusting the tradeoff parameter $\lambda$ results in different amounts of pruning, which correspondingly results in different amounts of effect on the output of the layer as a result of the pruning, i.e. a change in the output of the layer relative to the output using unpruned filters. A higher value for the tradeoff parameter $\lambda$ results in more zeroed rows in the selection matrix Z, which results in a smaller number of representative filters after the pruning, and a correspondingly larger effect on the output of the layer. A lower value for the tradeoff parameter $\lambda$ results in fewer zeroed rows in the selection matrix Z, which results in a larger number of representative filters after the pruning, and a correspondingly larger effect on the output of the layer.

By applying this pruning to each layer, the number of filters that can be eliminated without significantly affecting the output of a CNN can be significant, and thus can significantly reduce the computing power needed to process an input image with the resulting CNN.

Fine-Tuning the Optimized Model—Block 316

As discussed above, the replacement of the filters X in each filter layer in the CNN model 500 with the pruned filters Y is configured to have a low impact on the output of the CNN model 500. The low impact that may be present, however, may be additionally mitigated by further end-to-end fine-tuning of the CNN model 500. In block 316, the processor 14 executes programming instructions 24 corresponding to the OD-CNN optimizer component 208 and the training component 206 to perform end-to-end fine-tuning on the optimized CNN model 500.

To perform end-to-end fine-tuning of the model 500, the processor 14 unfreezes all of the weights in the base network 252 that were frozen during the previous training process, and then repeats the training according to the curriculum set via the training data manager component 204. In some embodiments, the learning rates for the fine-tuning training are the same as the learning rates during the initial training. In some embodiments, the learning rates in the fine-tuning training are reduced relative to the rates during the initial training.

The Produced OD-CNN

An OD-CNN 250 produced according to the method 300 is configured to identify and localize objects in an input image. In other word, for a given input image, the OD-CNN 250 produces an output data that includes classifications of objects found in the image as well as localizations of those objects within the image. The OD-CNN 250 has a high accuracy of object detection relative to conventional object detection techniques, and has relatively low computing power needs, and is operable in real time on a device without a dedicated GPU.

It should be understood that, in some embodiments, one or more of the blocks discussed above are modified, reordered, or omitted. For instance, in some embodiments, an OD-CNN 250 is produced without the application of curriculum learning. In some embodiments, an OD-CNN 250 is produced with various levels of pruning, or with no pruning at all. In some embodiments, the training dataset 32 is already in a form usable for training an object detection CNN, and no processing is required. In some embodiments, fine-tuning is not performed.

An Object Detection Device that Incorporates an OD-CNN

Figure 7:
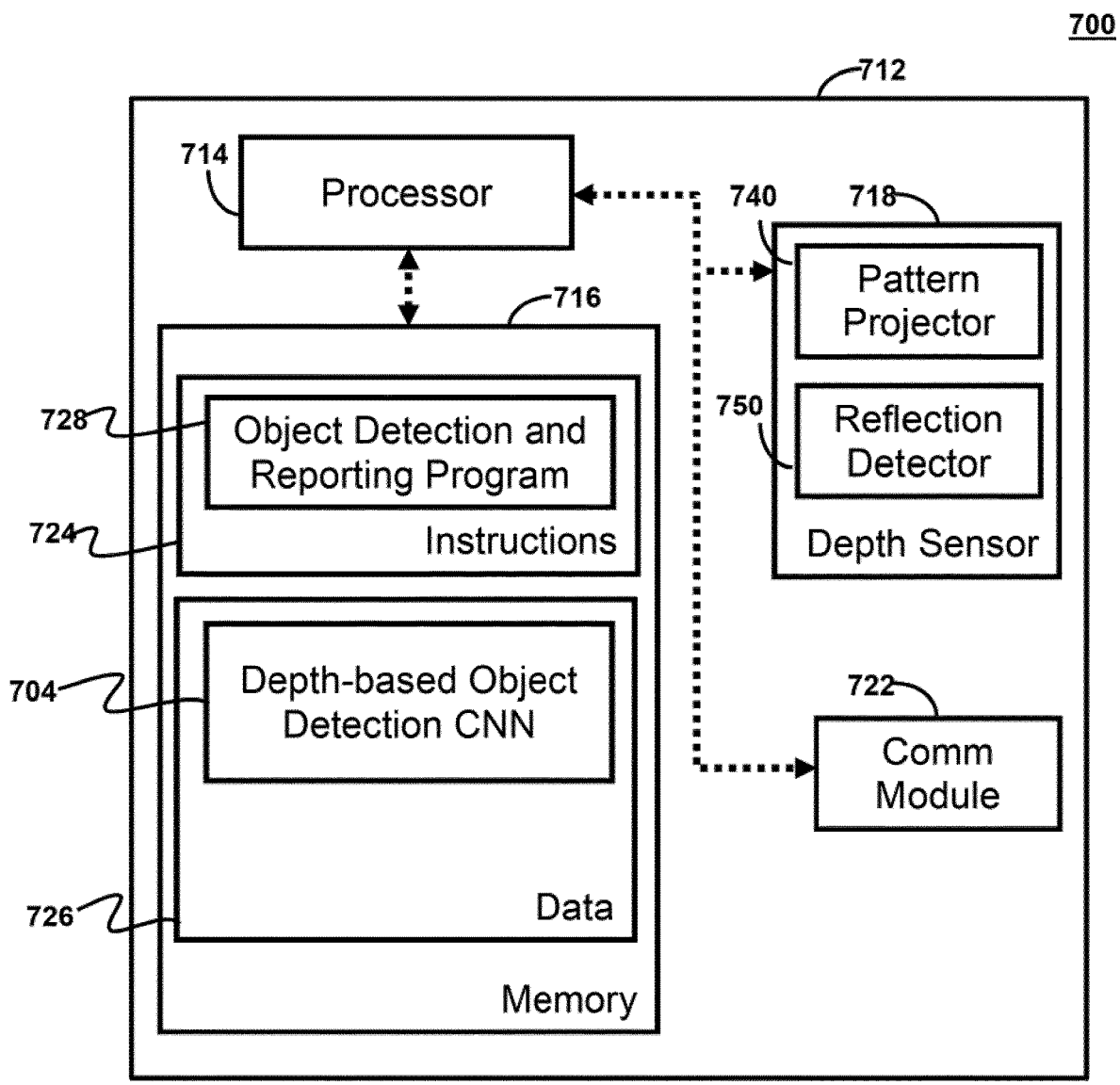
FIG. 7 shows a block diagram of an exemplary embodiment of an object detection device that incorporates a depth-based object detection convolutional neural network.

FIG. 7 shows a block diagram of an exemplary embodiment of an object detection system 700 that incorporates an OD-CNN 704. In various embodiments, the system 700 one or more of collects input depth images, identifies and localizes objects within the input un-paired depth images 702 using the OD-CNN 704, and produces an output with reference to the identified and localized objects in the input depth images.

The system 700 is typically provided in a housing, cabinet, or the like 712 that is configured in a typical manner for a sensor device. In the illustrated embodiment, the system 700 includes a processor 714, memory 716, a depth sensor 718, and a network communications module 722. It will be appreciated, however, that the illustrated embodiment of the system 700 is only one exemplary embodiment of a system 700 and is merely representative of any of various manners or configurations of a sensing device or system incorporating such a device that is operative in the manner set forth herein.

The processor 714 is configured to execute instructions to operate the system 700 to enable the features, functionality, characteristics and/or the like as described herein. To this end, the processor 714 is operably connected to the memory 716, the depth sensor 718, and the network communications module 722. The processor 714 generally comprises one or more processors which may operate in parallel or otherwise in concert with one another. It will be recognized by those of ordinary skill in the art that a "processor" includes any hardware system, hardware mechanism or hardware component that processes data, signals, or other information. Accordingly, the processor 714 may include a system with a central processing unit, multiple processing units, or dedicated circuitry for achieving specific functionality.

In this embodiment, the processor 714 is a System-on-a-Chip (SOC) that integrates the functionality of a CPU and a GPU. In some embodiments, the processor 714 additionally incorporates functionality of additional components, such as the memory 716 and/or the network communication module 722. In some embodiments, the processor 714 executes software programs including drivers and other software instructions.

The memory 716 may be of any type of device capable of storing information accessible by the processor 714, such as a memory card, ROM, RAM, write-capable memories, read-only memories, hard drives, discs, flash memory, or any of various other computer-readable medium serving as data storage devices as will be recognized by those of ordinary skill in the art. The memory 716 is configured to store program instructions 724 for execution by the processor 714, as well as data 726.

The program instructions 724 at least include an object detection and reporting program 728, which includes at least some instructions that implement the collection of input depth images 702 via the depth sensor 718, the identification and localization of objects within the input depth images 702 via operation of the OD-CNN 704, and the reporting such identification and localization as output 706 via the network communication module 22. In some embodiments, the programing instructions 724 further include a training data collection program (not shown) that implements the collection of input depth images 702 via the depth sensor 718, and the output of the collected depth images 702 via the network communication module 722. The data 726 includes the OD-CNN 704, which is configured similarly to the OD-CNN 250 produced via the method 300 discussed above.

The depth sensor 718 is a sensor configured for range imaging, i.e. producing depth image data with pixel values indicative of distances to various points in a scene from the viewpoint of the sensor. Various types of depth sensors are usable, including a stereo triangulation sensor, a light triangulation sensor, a structured light sensor, a time-of-flight sensor, an interferometer sensor, or the like.

In this embodiment, the depth sensor 718 is a structured light sensor. The depth sensor 718 includes a pattern projector 740 and a reflection detector 750. The pattern projector 740 is configured to project a static 2D pattern of light into a scene so that the pattern is reflected off of surfaces in the scene. In some embodiments, the pattern is a grid or other regularly spaced repeating shape. The reflection detector 750 is positioned so as to have a different perspective of the scene than the pattern projector 740, and is configured to detect a 2D reflection of the pattern on surfaces in the scene. In some embodiments, the pattern projector 740 and the reflection detector 750 respectively project and detect a particular wavelength of light such as, for example, infrared light. In this embodiment, the reflection detector 750 has a 2D resolution of approximately 512×424 pixels.

The network communication module 722 of the system 700 provides an interface that allows for communication with any of various devices using various means and may comprise one or more modems, transceivers, network adapters, or the like. In particular, the network communications module 722 may include a local area network port that allows for communication with any of various local computers housed in the same or nearby facility. In some embodiments, the network communications module 722 further includes a wide area network port that allows for communications with remote computers over the Internet. Alternatively, the system 700 communicates with the Internet via a separate modem and/or router of the local area network. In one embodiment, the network communications module is equipped with a Wi-Fi transceiver or other wireless communications device. Accordingly, it will be appreciated that communications with the system 700 may occur via wired communications or via the wireless communications. Communications may be accomplished using any of various known communications protocols.

The system 700 may be operated locally or remotely by a user. To facilitate local operation, the system 700 may include external controls and/or an onboard display. In some embodiments, the system 700 is only operable remotely.

In some embodiment, the system 700 includes a plurality of separate devices that operate in cooperation, such as over a communication network or other type of connection. In some embodiments, the depth sensor 718 is included in a first device, and the memory including one or more of the object detection and reporting program and the OD-CNN is included on a second device remote from the first device, whereby the first and second devices are configured to communicate with each other over a communication link. In some embodiments, one or more of the first and second devices is a mobile device.

Operation of the Depth-Based Object Detection Device

Figure 8:
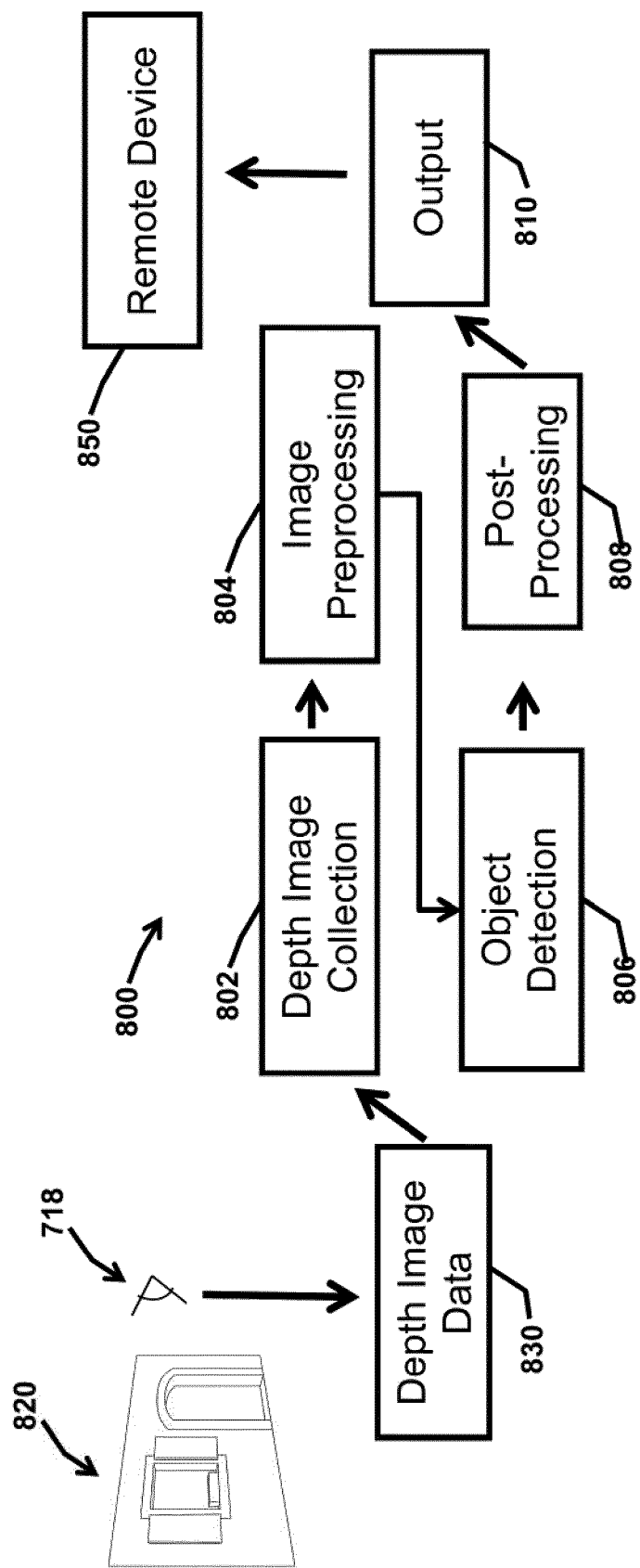
FIG. 8 shows a block diagram of functional components of the device of FIG. 7.

FIG. 8 depicts an exemplary embodiment of functional components 800 of the system 700 as implemented by the processor 714 with reference to the program instructions 724. Functional components can include hardware or a combination of hardware and software. In the description below, actions described as performed by or with functional components are executed by the processor 714 using the elements of the system 700 with reference to the program instructions 724 discussed above.

In FIG. 8, block 802 is a depth image collection component, block 804 is an image preprocessing component, block 806 is an object detection component, block 808 is a post-processing component, and block 810 is an output component. As depicted in FIG. 8, the system 700 views a scene 820 to collect input depth images 830, detects objects within the input depth images 830, and transmits the detection output to a remote computing device 850.

Figure 9:
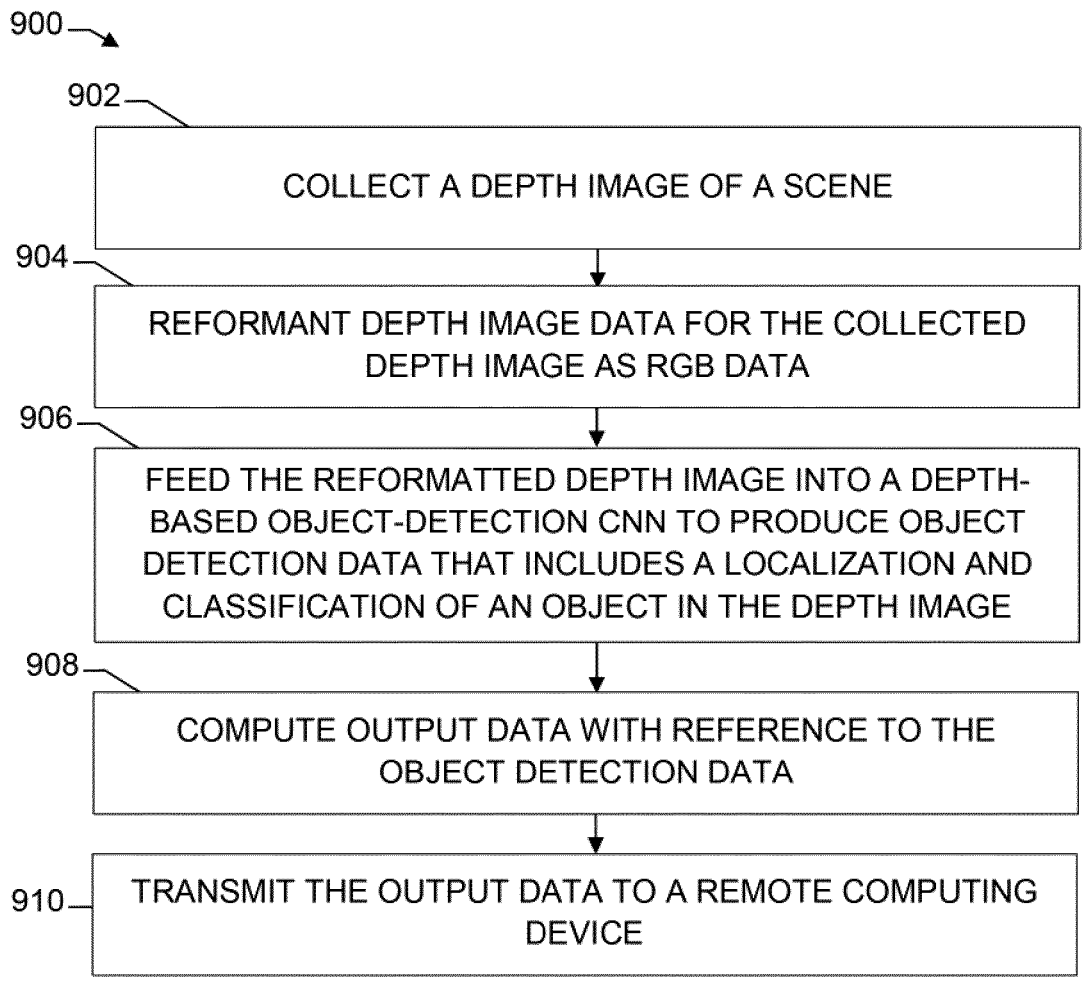
FIG. 9 shows a logical flow diagram for an exemplary embodiment of a method for operating the device of FIG. 7.

FIG. 9 depicts a flow diagram of an exemplary embodiment of a method 900 for operating the depth-based object detection system 700. At block 902, the processor 714 executes program instruction 724 corresponding to the depth image collection component 802 to operate the depth sensor 718 to collect a depth image 830 of the scene 820. In this embodiment, in which the depth sensor 718 is a structured light sensor, the processor 714 compares the pattern projected by the pattern projector 740 with the reflection of the pattern on the scene 820 as viewed by the reflection receiver 750. Due to the difference in view perspectives between the pattern projector 740 and the reflection receiver 750, 3D surfaces within the scene 820 cause the reflection of the projected pattern to appear distorted from the perspective of the reflection receiver 750. In particular, the geometric distortion of the pattern as viewed by the reflection detection 750 corresponds with the three-dimensional shape of surfaces in the scene 820.

Thus, by comparing the pattern projected by the pattern projector 740 with the reflection of the pattern on the scene 820 as viewed by the reflection receiver 750, the processor 714 computes data indicative of the 3D shape of the surfaces in the scene 820. In this embodiment, the resolution of the pattern produced by the pattern projector 740 and the resolution of the reflection detector 750 enable a maximum detection range of about 2.4 meters, and enable a fine-grained detection accuracy of about 1 millimeter. The processor 714 stores such data as depth image data in the memory 716, whereby sub-regions of the scene from the perspective of the reflection receiver 750 correspond to individual pixels in a depth image. Due to the maximum detection range of about 2.4 meters and detection accuracy of about 1 millimeter, each pixel in the depth image has a possible range from 0 to about 8000.

At block 904, the processor 714 operates programing instructions 224 corresponding to the preprocessing component 804 to reformat the depth image data for the input depth image 830 as RGB data via process similar to block 308 in the method 300. In this embodiment, reformatting the depth image data includes resizing the 512×424 resolution of the input depth image 830 to a resolution matching the input of the OD-CNN 704, e.g. 300×300. In this embodiment, reformatting the depth image data further includes applying a smoothing process to the depth image data to translate the 0-8000 range of pixels in the depth image into a range of 0-255 compatible with RGB data processing. In some embodiments, the reflection detection 750 has a resolution matching the input of the OD-CNN 704, and thus no resizing via the preprocessing component is required.

At block 906, the processor 714 operates programing instructions 224 corresponding to the object detection component 806 to feed the reformatted data depth image data for the input depth image 830 into the OD-CNN 704 in order to produce object detection data that includes information indicative of identities objects found in the input depth image 830 and information indicative of a localization of such objects within the input depth image 830. Since the input depth image 830 results from a view of the scene 820, the information indicative of identities and localizations of objects in the input depth image 830 is also indicative of identities and localizations of objects in the scene 820.

At block 908, the processor 714 operates programing instructions 224 corresponding to the post-processing component 808 to receive the object detection data from the OD-CNN 704, and compute output data with reference to the object detection data. In various embodiments, the output data includes one or more of a copy of the input depth image 830, annotation that identifies and localizes detected objects within the image 830, and metadata such as a time at which the input depth image 830 was received, and the like. At block 910 the processor 714 transmits the output data 706 to the remote computing device 850.

In some embodiments, the output data does not include a copy of the input depth image 830, or only selectively includes a copy of the depth image. Copying an image and/or transmitting an image to a remote computing device can be computationally costly and/or time consuming tasks. Transmitting output data that does not include or only selectively includes image data inhibits the transmission of the output data from becoming a bottleneck in the operation of the system 700.

In some embodiments, the processor 714 selectively includes image data in the output data in response to a detection of a particular class of object in the input depth image 830. For example, in an embodiment where the OD-CNN is configured to detect the presence of a gun in the scene 820, the processor 714 is configured to selectively transmit an annotated copy of the input depth image 830 in response to detecting the presence of a gun in the input depth image 830.

In another example, the processor 714 receives an instruction to include image data in the output data from the remote computing device 850 via the network communication module 722. For instance, a user operating the remote device 850 may have requested an annotated image, or the remote device 850 may have been preprogrammed to issue the instruction.

In some embodiments, the processor 714 is configured to compute correlations between multiple instances of output data over time. For example, over a period of time, an object is moving through the scene 820. A sequence of input depth images 830 taken over that period of time results in a sequence of output data in which the same class of object is identified at multiple locations. The processor 714 is configured to compute that the multiple identifications of the same class of object are likely to correspond to a single object that is moving, rather than multiple different objects. In some embodiments, the processor 714, in response to identification of a moving object, the post-processing component 808 is configured to compute a travel path for the object, a velocity vector for the object, a likely future path for the object, or the like.

In some embodiments, the memory 716 includes information about the scene 820, and the processor 714 is configured to compute a condition of the moving object with reference to the information about the scene 820. For example, in an embodiment, a portion of the scene 820 is labeled as an "entrance" and a portion of a scene 820 is labelled as an "exit." The processor 714 is configured to compare the motion and position of an object with the locations of the entrance and exit regions to determine whether the object is moving toward the entrance or the exit, and thus is configured to track and/or count a number of objects entering and/or exiting the scene 820. In another example, a portion of a scene is labelled as a hazard. The processor 714 is configured to compare the motion and positon of an object with the location of the hazard region to determine if the object is in or is moving toward the hazard, and thus is configured to transmit output data that includes an indication that the object is in or is moving to the hazard.

In some embodiments, the input depth image data 830 is not fed into the OD-NN 704, but instead is included directly in the output data 706 and transmitted to the remote computing device 850, e.g. for use as training data.

This method 900 improves upon the functioning of an object detection device by incorporating an OD-CNN so as to enable object detection in real time without the use of a dedicated GPU. This method 900 also improves upon the functioning of an object detection device by removing the requirement of an RGB camera for object detection.

An object detection device without an RGB camera not only reduces a cost and complexity of the object detection device, but also results in other improvements, such as a decreased privacy risk. Many potential applications for object detection are in public or semi-public spaces at which people may be uncomfortable with constant observation by camera. Further, since RGB images are not collected or stored, there is less risk of private or personal information being taken. In particular, an RGB image collected by an object detection system may include text, such as from a personal document. Depth images, however, do not include color, and thus text or images on surface would not be visible.

Experimental Results

For the Experiments below, an object detection system 700 was mounted on a ceiling so that a scene 820 viewed by a depth sensor 718 of the devices included a doorway. The system 700 was operated to collect depth images 830 over a period of time of approximately 1.5 hours, while people passed through the doorway carrying various items including: a laptop, a backpack, an umbrella, a phone, a box, a cup, and a weapon.

Figure 10:
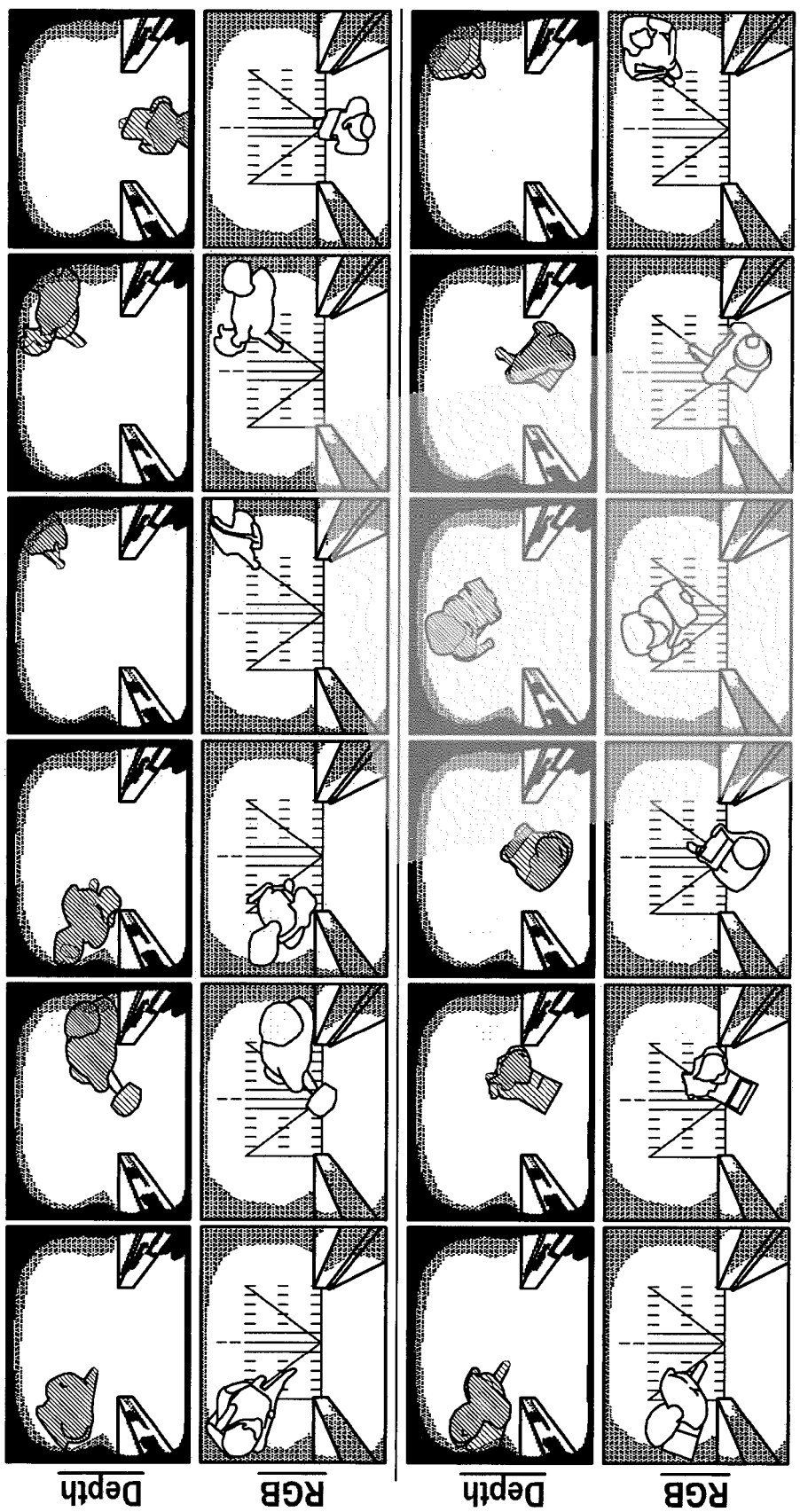
FIG. 10 shows a set of depth images usable as input the device of FIG. 7, alongside illustrative RGB images.

For the purpose of illustration, the system 700 in this instance included an RGB camera paired with the depth sensor 718 for the purpose of more clearly illustrating the view of depth sensor 718. However, it should be understood that the RGB images from the RGB camera discussed below are included only for the purpose of illustration, and not to suggest that an RGB camera or paired data is required for the operation of the system 700. FIG. 10 depicts a set of the collected depth images 830, shown alongside RGB images that help illustrate the scene.

The collected input depth images 830 were provided to a system 10 for building an OD-CNN 704. An MIL process was applied to the input depth images to compute identifications and localizations for objects in the image. In this MIL process, each annotated image includes only one identified and localized object, so that a single frame with multiple objects, i.e. a Person and a Backpack results in one training frame annotated to locate and identify the Person, and another duplicate frame annotated to locate and identify the Backpack.

The total number of frames containing each class of object is tabulated below in Table 1.

TABLE 1

| Object Class | Person | Backpack | Box | Cup | Weapon | Laptop | Phone | Umbrella |
|---|---|---|---|---|---|---|---|---|
| Total Frames | 65,084 | 21,948 | 1,059 | 777 | 19,379 | 20,693 | 558 | 670 |

These annotated frames were divided into a first set including 80% of the total frames to be used as training data in the experiments below, and a second set including the remaining 20% to be used as test data.

Experiment 1—Different Base Networks

In this experiment, base networks from different image classification CNNs were used to build an OD-CNN. Base networks were extracted from each of (i) a pre-trained ZFNet image classification CNN, (ii) a pre-trained ThiNet image classification CNN, and (iii) a pre-trained VGG16 image classification CNN, which were each used to build OD-CNNs via the method 300 discussed above. For this experiment, training using the training data above was performed without a curriculum, and no post-training optimization was performed. The resulting OD-CNNs for the different base networks are respectively labelled as (i) OD-ZFNet, (ii) OD-ThiNet, and (iii) OD-VGG16.

The test data was fed into each of the OD-CNNs, and the accuracy of each OD-CNN for identifying each class of object, along with a mean Average Precision (mAP) across all of the object classes is tabulated below in Table 2.

TABLE 2

|  | mAP | Person | Backpack | Box | Cup | Weapon | Laptop | Phone | Umbrella |
|---|---|---|---|---|---|---|---|---|---|
| OD-ZFNet | 55.49 | 82.25 | 83.53 | 87.88 | 20.21 | 60.72 | 76.77 | 0.65 | 30.56 |
| OD-ThiNet | 49.88 | 63.35 | 86.33 | 48.95 | 15.93 | 84.63 | 82.52 | 1.13 | 17.08 |
| OD-VGG16 | 78.94 | 89.34 | 94.53 | 90.05 | 63.32 | 90.49 | 91.5 | 35.89 | 77.37 |

From Table 2 above, OD-VGG16 exhibited not only the highest mAP, but also the highest accuracy for each class of objects. Larger object classes, such as person, backpack, box, and weapon, had high accuracies above 85%, while smaller object classes such as cup and phone had lower accuracies under 40%, which may be due to the smaller scale of visible features for such objects. Additionally, lower accuracy on some categories may have resulted from an underrepresentation of those object classes in the training data.

Experiment 2—Effect of Post-Training Optimization on Number of Filters and CNN Size For this experiment, the base network of the VGG16 was used to build three identical object classification CNNs. Thereafter, each of the three CNNs was subjected to a different level of post-training optimization: a first that includes no pruning of filters, a second that includes a relatively low amount of pruning (low), and a third that includes a relatively high amount of pruning (high). The second and third levels resulted in a reduction of filters in various layers of the CNN as well as a corresponding reduction in the total amounts of weights in each CNN. Layers that included filters that were pruned are tabulated in FIG. 11, along with the total number of weights for each level, and the resulting file size of each resulting OD-CNN. In FIG. 11, the higher level of pruning resulting in a larger reduction in filters weights, and file size.

Experiment 3—Effect of Curriculum Learning and Post-Training Optimization on Accuracy The effects of curriculum learning and post-training optimization were determined by using the best-performing base network from Experiment 1, i.e. the base network from the VGG16 network, and rebuilding OD-VGG16 while varying the inclusion of curriculum learning as well as the presence and amount of post-training optimization.

For this experiment, three levels of post-training optimization were used, a first that includes no pruning of filters, a second that includes a relatively low amount of pruning (low), and a third that includes a relatively high amount of pruning (high). For this Experiment, curriculum learning includes separating the training data into a batch $D_1$ that excludes frames where the annotation located and identified a Person, and a batch $D_2$ that includes the frames annotated to locate and identify a Person. The test data was fed into each version of OD-VGG16, and the accuracy of each version for identifying each class of object, along with a mean Average Precision (mAP) across all of the object classes is tabulated below in Table 3.

TABLE 3

|  | mAP | Person | Backpack | Box | Cup | Weapon | Laptop | Phone | Umbrella |
|---|---|---|---|---|---|---|---|---|---|
| No Curriculum No Pruning | 78.94 | 89.34 | 94.53 | 90.05 | 63.32 | 90.49 | 91.5 | 35.89 | 77.37 |
| Curriculum with No Pruning | 84.94 | 90.68 | 90.83 | 80.86 | 71.57 | 95.96 | 90.59 | 68.42 | 90.66 |
| No Curriculum with Low Pruning | 75.43 | 87.12 | 90.76 | 88.12 | 54.24 | 90.79 | 90.08 | 18.12 | 84.17 |
| No Curriculum with High Pruning | 51.59 | 89.15 | 85.44 | 43.04 | 19.11 | 80.25 | 78.79 | 3.15 | 13.83 |
| Curriculum with Low Pruning | 80.14 | 89.78 | 90.84 | 83.68 | 66.50 | 90.89 | 90.52 | 46.67 | 82.31 |
| Curriculum with High Pruning | 71.35 | 88.18 | 90.20 | 72.40 | 46.26 | 88.85 | 85.53 | 21.12 | 72.28 |

From the above, the application of curriculum learning consistently raised the accuracy of object detection, although the magnitude of the increase appeared to have diminishing returns when a class was already detected with relatively high accuracy. Additionally, pruning appeared to decrease the accuracy of object detection, with high pruning having a slightly more noticeable effect. It also appears that pruning had a higher detrimental effect on object classes corresponding to objects of smaller size.

Experiment 4—Effect of Curriculum Learning and Post-Training Optimization on Computing Power Needs Each version of the OD-VGG16 prepared above for Experiment 3 was incorporated into computing systems with different processing architecture. A first system includes an NVIDIA® GTX 1080 Ti dedicated GPU, a graphics card with 3,584 cores. A second system includes an NVIDIA® Tesla K40 dedicated GPU, a graphics card with 2,880 cores. A third system includes an NVIDIA® Jetson TX1, an embedded GPU/CPU SOC with 265 cores. A fourth system includes an NVIDIA® Jetson TK1, an embedded GPU/CPU SOC with 192 cores.

The test data was fed into each version of OD-VGG16 for each of the four systems above, but omitting the version with high-pruning and no curriculum due to having a low overall mAP. The framerates, in FPS, for each version of OG-VGG16 in each system are tabulated below in Table 4, along with the mAP and file size of each version.

TABLE 4

| | | | FPS per System | | | |
|---|---|---|---|---|---|---|
| | mAP | File Size (MB) | GTX 1080 Ti | Tesla K40 | Jetson TX1 | Jetson TK1 |
| No Curriculum No Pruning | 78.94 | 96.43 | 41.5 | 14.85 | 3.25 | 1.32 |
| Curriculum with No Pruning | 84.94 | 96.43 | 41.5 | 14.85 | 3.25 | 1.32 |
| No Curriculum with Low Pruning | 75.43 | 76.36 | 69.33 | 26.1 | 5.94 | 2.47 |
| Curriculum with Low Pruning | 80.14 | 76.36 | 69.33 | 26.1 | 5.94 | 2.47 |
| Curriculum with High Pruning | 71.35 | 23.02 | 104 | 42.6 | 11.93 | 3.79 |

These results illustrate the improvement in reduced computing power enabled by an OD-CNN according to this disclosure. For example, a conventional object detection CNN with a similar mAP of 74.3 operating on an NVIDIA® TITAN X, a dedicated graphics card with 3072 cores operates at about 59 FPS. Another conventional CNN that was capable of operating at about 155 FPS operates with an mAP of about 52.7. Thus, the versions of OD-VGG16 above are faster and more accurate than conventional CNNs when operating on similar dedicated graphics cards. However, from the table above, the version of OD-VGG16 above are also capable of real-time operation (i.e. FPS>1) on embedded GPUS that have less than 10% of the processing cores as the dedicated graphics cards discussed above.

The results above also show that pruning results in a significant increase in FPS, and thus represents a significant decrease in required computing power. Moreover, the low amount of pruning decreases mAP by less than 5%, and results in a more than 50% gain in FPS.

Experiment 5—Testing an OD-CNN with De-Novo Test Data

In this Experiment, six additional test depth images were taken at a different doorway completely separate from the doorway used to collect the dataset for the previous Experiments. The additional test images were taken so as to have a similar perspective view as the images in the previous dataset. For the purpose of illustrating the scene, RGB images paired to the test depth images were also collected. The additional test depth images were fed into an OD-CNN built according to this disclosure. The additional test images, paired RGB images, and the resulting object detection and localizations are tabulated in FIG. 12. From FIG. 12, despite that the particular scene is a different doorway, the OD-CNN was able to accurately identify and localize objects in the additional test images.

Other Applications and Embodiments

It should be understand that the techniques, methods, and devices above pertaining to depth image data are also applicable to image data of other modalities, such as x-ray, infra-red, ultrasonic, and the like.

Also, while examples, embodiments, and experiments discussed above pertained to particular applications of use, such as an object detector mounted above a doorway, the technologies disclosed herein may be applied to a wide variety of applications. For example, in one embodiment, an object detection device according to this disclosure is mounted on a motor vehicle so as to detect an environment of the vehicle and/or enable assisted or self-driving operation of the vehicle. In another embodiment, an object detection device according to this disclosure is incorporated into a user authentication system that identifies and authorizes a user based on facial features, physical features, movement patterns, etc. In a further embodiment, an object detection device according to this disclosure is configured to track the location of objects within a defined space. In an embodiment, an object detection device according to this disclosure is configured to detect motions and/or gestures of a person, so as to enable interaction of the person with a computing system by performing different motions and gestures. In one embodiment, a mobile device such as a mobile telephone includes a depth sensor and incorporates an OD-CNN according to this disclosure.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

What is claimed is:

1. A method of training a convolutional neural network for depth-based object detection, the method comprising:
   storing, in a memory, data and program instructions corresponding to a convolutional neural network, including:
      a base network configured to receive RGB image data as input and compute output data indicative of at least one feature of an object in the received RGB image data, the base network pre-trained to compute feature detections using an RGB image dataset; and
      additional structure configured to receive the output data of the base network as input and compute predictions of a location of a region in the received RGB image that includes the object and of a class of the object, such that the convolutional neural network is configured to receive RGB test image data as input and compute the predictions as output;
   storing, in the memory, (i) a dataset of training depth images, each including at least one annotation that localizes a region of a respective depth image as containing a training object and identifies a class of the training object and (ii) a complexity metric for each image in the dataset of training depth images, the complexity metric indicative of a feature complexity of the respective image;
   generating, with a processor, a training dataset for the convolutional neural network by reformatting each image in the dataset of training depth images as an RGB image; and
   training, with the processor, the convolutional neural network using the training dataset to form a depth-based object-detection convolutional neural network configured to receive a depth image formatted as RGB image data as input and compute predictions of a location of a region in the received depth image that includes a test object and of a class of the test object as output, the training including:
segmenting the training dataset into a first batch and a second batch such that the first batch has complexity metrics that are higher than complexity metrics of the second batch; and
introducing the training dataset to the convolutional neural network according to a curriculum that orders images within the training dataset by ascending complexity metric, the curriculum including training the convolutional neural network using the first batch of the training dataset and then training the convolutional neural network using the first batch and the second batch of the training dataset.

2. The method of claim 1, wherein:
the convolutional neural network includes a plurality of convolutional filters distributed throughout a sequence of layers;
each convolutional filter in the plurality of convolutional filters is configured to receive input data and compute convolutional output data by convolving a respective matrix of weights over the input data;
each layer in the sequence of layers is configured to receive input data and compute output data formed by a combination of the output data of each filter in the layer;
the base network includes a first subset of the sequence of layers; and
the additional structure includes a second subset of the sequence of layers.

3. The method of claim 2, wherein:
the second subset of the sequence of layers includes a plurality of feature map layers;
each feature map layer has a different dimensionality, and is configured to detect features in the input data for the feature map layer of a scale corresponding to the respective dimensionality of the feature map layer; and
the plurality of feature map layers is arranged within the sequence of layers in order of descending dimensionality.

4. The method of claim 3, wherein the additional structure further includes a post-processing block that is configured to:
receive the output data from each feature map layer;
select a particular feature from amongst features detected by the plurality of feature map layers having a relative highest correspondence with an object of a particular classification;
compute a location of the object based on a location of the feature; and
output the location and classification of the object.

5. The method of claim 2, further comprising:
after training the convolutional neural network:
identifying at least one of the plurality of convolutional filters that at least one of
(i) is at least partially redundant of another of the plurality of convolutional filters, and
(ii) has an effect on the output of the convolutional neural network below a predetermined threshold; and
modifying the data and program instructions corresponding to the convolutional neural network to eliminate the identified at least one filter from the convolutional neural network.

6. The method of claim 5, further comprising:
after eliminating the identified at least one filter from the convolutional neural network, training, with the processor, the convolutional neural network using the training dataset.

7. The method of claim 6, wherein:
when training the convolutional neural network, the matrices of weights of filters within the first subset of the sequence of layers in the base network are frozen; and
when training the convolutional neural network, the matrices of weights of all filters within the convolutional neural network are unfrozen.

8. A system for training a convolutional neural network for depth-based object detection, the system comprising:
a data storage device configured to store:
data and program instructions corresponding to an convolutional neural network having a plurality of convolutional filters distributed throughout a sequence of layers, the convolutional neural network including:
a base network configured to receive RGB image data as input and compute output data indicative of at least one feature of an object in the received RGB image data, the base network pre-trained to compute feature detections using an RGB image dataset; and
additional structure configured to receive the output data of the base network as input and compute predictions of a location of a region in the received RGB image that includes the object and of a class of the object, such that the convolutional neural network is configured to receive RGB test image data as input and compute the predictions as output; and
a dataset of training depth images, each including at least one annotation that localizes a region of a respective depth image as containing a training object and identifies a class of the training object; and
at least one processor operably connected to the data storage device, the at least one processor being configured to execute the plurality of program instructions on the data storage device to:
generate a training dataset by reformatting the dataset of depth images as RGB image data;
train the convolutional neural network using the training dataset;
identify, after training the convolutional neural network, at least one of the plurality of convolutional filters that at least one of (i) is at least partially redundant of another of the plurality of convolutional filters, and (ii) has an effect on the output of the convolutional neural network below a predetermined threshold; and
modify, after training the convolutional neural network, the data and program instructions corresponding to the convolutional neural network to eliminate the identified at least one filter from the convolutional neural network.

9. An object detection system for localizing an object within a scene and identifying a classification for the object, the device comprising:
a data storage device that stores data and program instructions corresponding to a convolutional neural network having a plurality of convolutional filters distributed throughout a sequence of layers, the convolutional neural network including:
a base network formed by a first subset of the sequence of layers and configured to receive RGB image data as input and compute output data indicative of at least one feature of an object in the received RGB image data, the base network pre-trained to compute feature detections using an RGB image dataset; and
additional structure formed by a second subset of the sequence of layers and configured to receive the output data of the base network as input and compute predictions of a location of a region in the received RGB image that includes the object and of a class of the object, such that the convolutional neural network is configured to receive RGB test image data as input and compute the predictions as output, the second subset of the sequence of layers includes a plurality of feature map layers, each respective feature map layer having a different respective dimensionality and being configured to detect features in the input data for the feature map layer of a scale corresponding to the respective dimensionality of the respective feature map layer, the plurality of feature map layers being arranged within the sequence of layers in order of descending dimensionality;
a depth sensor configured to sense distances to various points on surfaces in a scene and compute depth image data with reference to the sensed distances;
an output component; and
a processor operatively connected to the data storage device, the depth sensor, and the output component, and configured to:
operate the depth sensor to collect depth image data;
reformat the depth image data as RGB image data;
determine a prediction of a location of a region in the depth image data that includes the object and identify a classification for the object by feeding the corresponding RGB image data through the convolutional neural network; and
output the location and classification of the object via the output component.

10. The object detection device of claim 9, wherein the processor is a system-on-a-chip that includes a central processing unit and a graphics processing unit embedded with the central processing unit.

11. The object detection device of claim 10, wherein the processor is configured to operate the depth sensor to collect depth image data and operate the output component to output the location and classification of the object via the output component at a rate in excess of 1 frame per second.

12. The object detection device of claim 11, wherein the processor is configured to determine prediction of locations of a plurality of objects in the image data and a respective identification for each object.

* * * * *